United States Patent
Nakagawa et al.

[11] Patent Number: 6,049,194
[45] Date of Patent: Apr. 11, 2000

[54] GENERATING APPARATUS INCLUDING MAGNETO ACTING AS POWER SUPPLY

[75] Inventors: Masanori Nakagawa; Yutaka Inaba, both of Numazu, Japan

[73] Assignee: Kokusan Denki Co., Ltd., Shizuoka-ken, Japan

[21] Appl. No.: 09/121,385

[22] Filed: Jul. 23, 1998

[30] Foreign Application Priority Data

Jul. 25, 1997 [JP] Japan ................................. 9-200317

[51] Int. Cl.⁷ .................................................. H02H 7/06
[52] U.S. Cl. .......................................................... 322/20
[58] Field of Search .............................. 322/20; 318/145; 363/132

[56] References Cited

U.S. PATENT DOCUMENTS

| | | | |
|---|---|---|---|
| 5,038,092 | 8/1991 | Asano et al. ............................. | 318/811 |
| 5,255,175 | 10/1993 | Uchino ..................................... | 363/81 |
| 5,648,705 | 7/1997 | Sitar et al. ............................... | 318/145 |
| 5,793,167 | 8/1998 | Liang et al. ............................. | 318/141 |

FOREIGN PATENT DOCUMENTS

| | | |
|---|---|---|
| 48-17943 | of 1973 | Japan . |
| 49-41891 | of 1974 | Japan . |
| 51-22244 | of 1976 | Japan . |
| 5-22462 | of 1993 | Japan . |

*Primary Examiner*—Nestor Ramirez
*Assistant Examiner*—Peter Medley
*Attorney, Agent, or Firm*—Pearne, Gordon, McCoy & Granger LLP

[57] ABSTRACT

A generating apparatus for feeding a current to a battery using a magneto as a power supply is disclosed which is capable of varying a magnetic field acting on generating coils to widely control characteristics of the magneto. A rectifying/switch circuit is arranged between the magneto and a load, which incorporates the battery. The rectifying/switch circuit includes diodes and switch elements. The diodes are 2n (n≧2) in number and are bridge-connected to each other. The switch elements are connected to the diodes by reverse parallel connection. A switch control unit applies an AC control voltage of a predetermined phase from the battery through the rectifying/switch circuit to the generating coils, so that a phase of the AC control voltage may be varied to widely vary characteristics of the magneto.

12 Claims, 15 Drawing Sheets

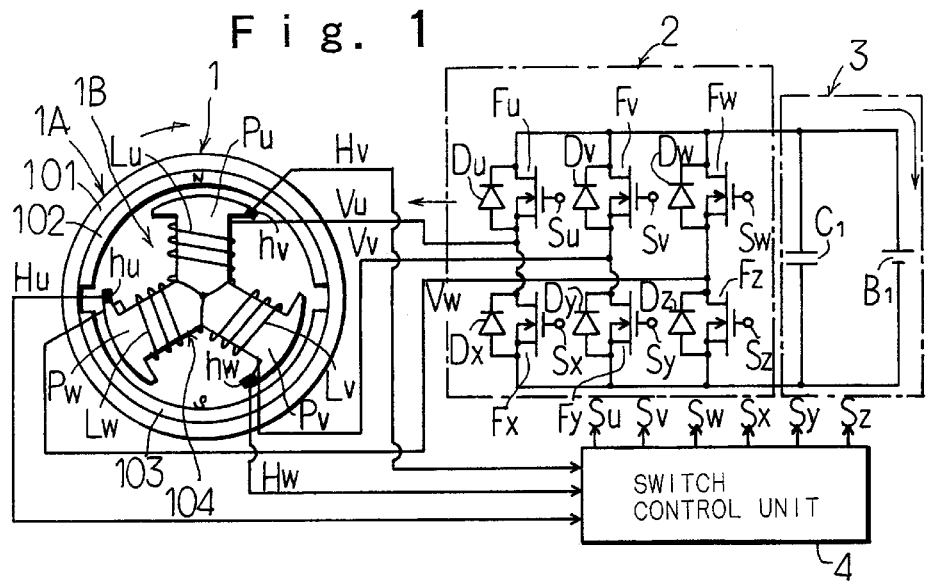
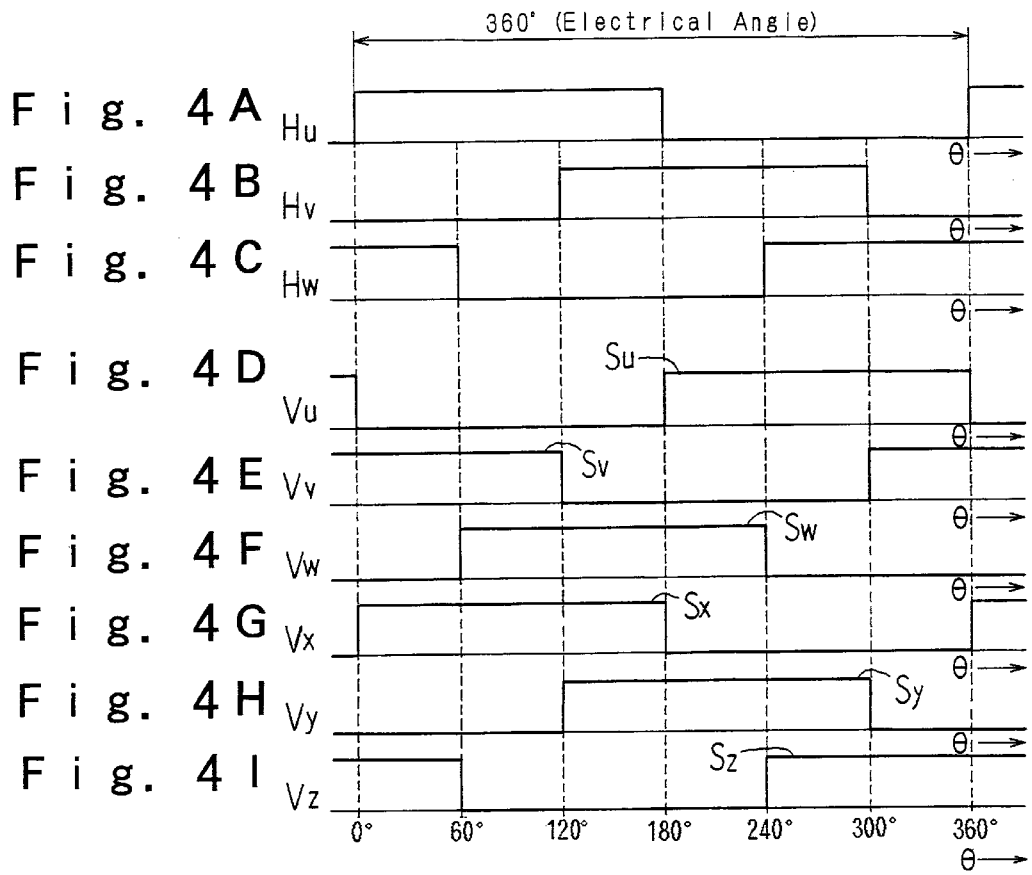

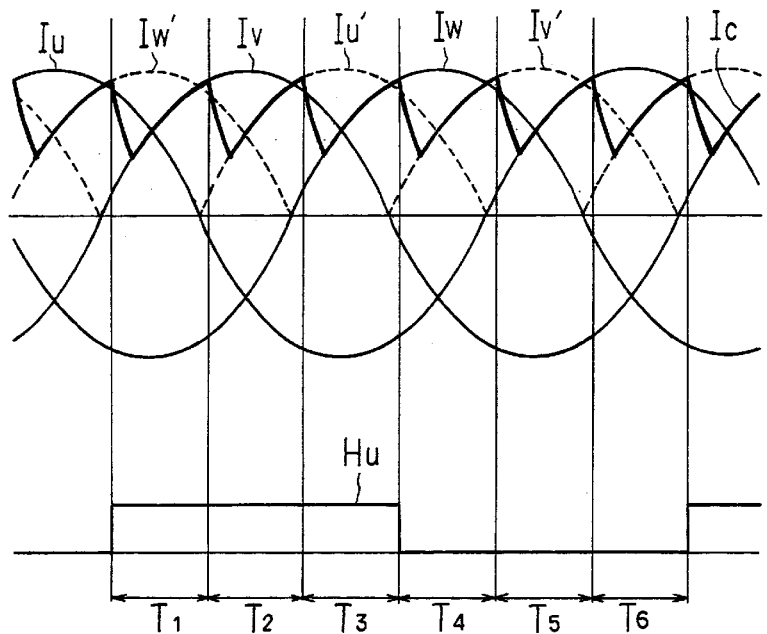
Fig. 5A
Fig. 5B
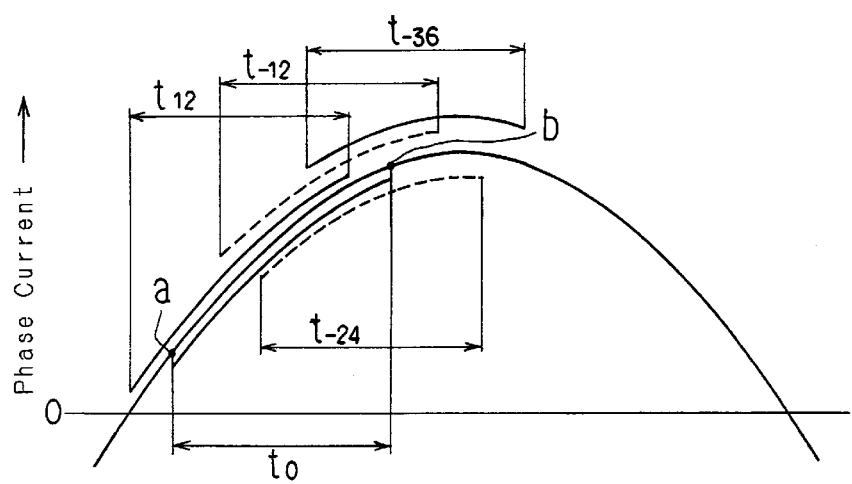
Fig. 6

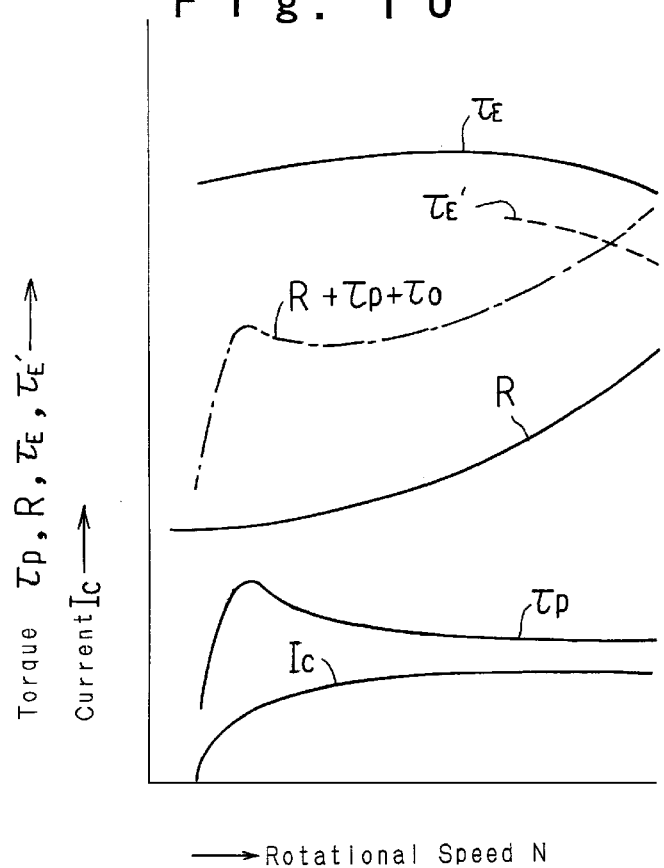
Fig. 10
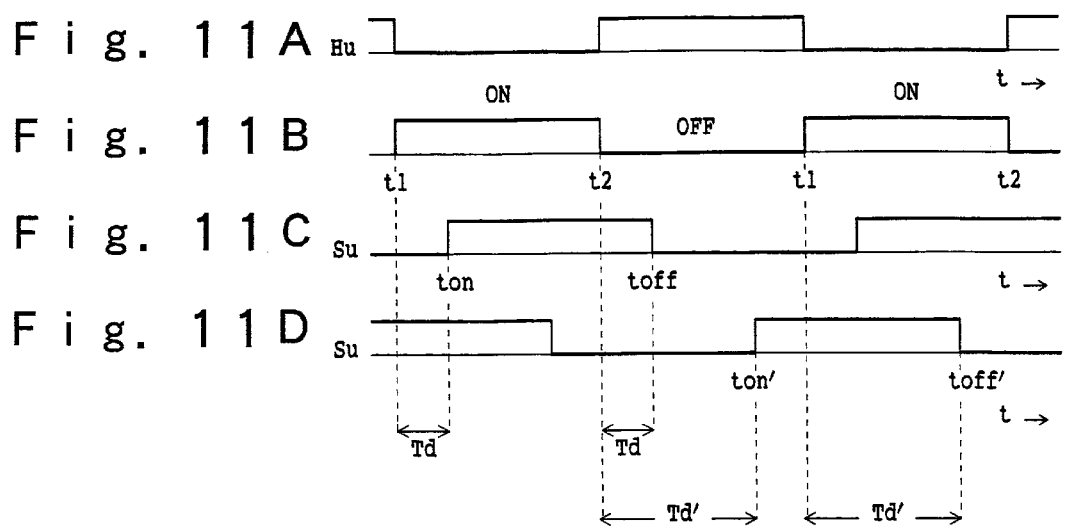
Fig. 11A
Fig. 11B
Fig. 11C
Fig. 11D

6,049,194

GENERATING APPARATUS INCLUDING MAGNETO ACTING AS POWER SUPPLY

BACKGROUND OF THE INVENTION

This invention relates to a generating apparatus including a magneto acting as a power supply, and more particularly to a generating apparatus for feeding an electric power to a load including a voltage accumulating means such as a battery or the like.

A magneto has been typically used as a generator mounted on an internal combustion engine for driving a vehicle. The magneto, as widely known in the art, includes a rotor adapted to provide a magnet field by means of a permanent magnet mounted on a rotor yoke and a stator constituted of an armature core and generating coils wound on the core. The rotor is mounted on a revolving shaft of a prime mover and the stator is fixed on a mounting section provided on a casing of the prime mover, a cover thereof or the like, wherein a pole section of the armature core is rendered opposite to a pole section of the rotor through a gap of a predetermined size.

A load of the magneto or generator mounted on the internal combustion engine typically includes a battery acting as a voltage accumulating means, so that an output of the magneto is fed to the battery through a rectifying circuit. Also, the rectifying circuit typically has a smoothing capacitor connected to an output side thereof.

When such a magneto as described above is mounted on an internal combustion engine for driving a vehicle, input torque of the magneto or generator affects acceleration performance of the engine. Thus, if it is possible to suitably vary the input torque depending on traveling conditions of the vehicle, the input torque may be reduced as required, so that control which permits acceleration performance of the engine to be enhanced may be attained.

However, the magneto wherein a magnet field is provided by the permanent magnet causes an output thereof to be directly determined when a load thereof is determined, and concurrently an input thereto required is likewise determined. Thus, in the prior art, it was thought to be impossible to suitably vary an input torque of the magneto. Therefore, the prior art does not control input torque of the magneto in order to increase acceleration performance of the engine.

In view of the foregoing, in the prior art, in order to provide acceleration performance of a predetermined level while rendering the input torque required for operating the magneto at every rotational speed of the engine unvaried, the engine is designed to increase an output of the engine to the utmost. However, techniques of increasing an output of the engine are currently approaching the limitation, so that further significant improvement of the acceleration performance by design of the engine is not expected.

Also, in the prior art, when the battery is charged with a rectified output of the magneto which provides a magnet field by means of a permanent magnet, it is not possible to freely vary a charging current for the battery flowing at each of the engine speeds. Thus, when there is likelihood that an excessive charging current flows to the battery at a high rotational speed of the engine, a regulator of the output short-circuit type, which includes a short-circuit switch element for short-circuiting an output of the magneto and a control circuit for on-off controlling the switch element depending on an output of the magneto, is provided to turn on the short-circuit switch element when an output of the magneto is excessive, to thereby short-circuit an output of the magneto.

Unfortunately, use of such an output short-circuit type regulator causes a large amount of short-circuit current to flow through the short-circuit switch element, so that it is required to increase a current capacity of the switch element, leading to an increase in cost.

Also, the output short-circuit type regulator increases generation of heat from the short-circuit switch element. This requires a heat sink of a large scale in order to cool the switch element, resulting in the generating apparatus being disadvantageously large-sized.

SUMMARY OF THE INVENTION

The present invention has been made in view of the foregoing disadvantage of the prior art.

Accordingly, it is an object of the present invention to provide a generating apparatus for feeding an electric power to a load including a voltage accumulating means while using a magneto as a power supply, which is capable of controlling characteristics of the magneto in order to control both an input and an output of the magneto.

It is another object of the present invention to provide a generating apparatus for feeding an electric power to a load including a voltage accumulating means while using a magneto as a power supply, which is capable of controlling an output of the generating apparatus without short-circuiting an output of the magneto.

It is a further object of the present invention to provide a generating apparatus for feeding an electric power to a load including a voltage accumulating means while using a magneto as a power supply, which is capable of varying input torque of the magneto in order to control acceleration performance of an internal combustion engine.

The present invention is directed to a generating apparatus for feeding a DC current to a load including a voltage accumulating means such as a battery, a capacitor or the like while using a magneto which includes a rotor having a magnet field and a stator including generating coils as a power supply. The present invention employs a basic concept that a switch circuit of the inverter type is arranged between the generating coils and the load. The switch circuit applies an AC control voltage having predetermined phases from the load through the switch circuit to the generating coils, to thereby vary magnetic flux interlinking the generating coil of a phase and permits an output current thereof to be flow the load.

The generating coil of the present invention includes a rectifying/switch circuit including a diode bridge full-wave rectifying circuit and a switch circuit. The diode bridge full-wave rectifying circuit is constituted by diodes of 2n (n: an integer of 2 or more) in number bridge-connected to each other and constructed so as to feed an output of the magneto to the load while rectifying the output. The switch circuit is constituted by switch elements of 2n in number respectively connected to the diodes by reverse parallel connection, to thereby be bridge-connected to each other. The generating apparatus also includes a switch control unit for setting both a drive period and a non-drive period of each of the switch elements of the switch circuit. The switch control unit also feeds each of the switch elements with a drive signal for keeping each of the switch elements turned on during the set drive period. An AC control voltage, which has a predetermined phase angle with respect to a voltage induced across the generating coils during no-load, is applied from the voltage accumulating means through the switch circuit to the generating coils.

The switch control unit is provided with a phase angle control means for varying a phase of the control voltage with respect to the voltage induced on each of the generating coils during no-load. The phase of the control voltage relative to the induced voltage may be adjusted from a lagging or delay phase to a leading or advance phase so that characteristics to be controlled (hereinafter referred to as "controlled characteristics"), which are specific characteristics of the magneto, may be set to desired characteristics or values.

The switch control unit may be constructed so as to vary phases of the control voltage depending on displacement of a manually-operated dial or the like. Alternatively, it may be constructed so as to vary the phases to render a deviation between a value detected by a detector for detecting a present value of a variable of controlled characteristics of the magneto and a target value zero while using an output of the detector as an input therefor. The variable may be an output voltage of the magneto, an output current thereof, input torque thereof or the like. The characteristics of the magneto which may be controlled as the controlled characteristics include, for example, output (voltage or current) to rotational speed characteristics, input torque to rotational speed characteristics and the like.

The switch element may be an on-off controllable semiconductor switch element such as a field effect transistor (FET), a bipolar transistor, an insulated gate transistor (IGBT) or the like.

As described above, the switch circuit is constituted by the switch elements of 2n in number respectively connected to the diodes by reverse parallel connection, to thereby be bridge-connected to each other. When a timing at which on-off operation of the switch elements constituting the switch circuit is controlled to apply the AC control voltage having a predetermined phase angle with respect to a voltage induced across each of the generating coils from the voltage accumulating means through the switch circuit to the generating coil, a magnetic field acting on the generating coil is synthesized of a rotation magnetic field generated by rotation of a magnet field and a control magnetic field generated from each of the generating coils depending on a control current due to the AC control voltage. In this instance, when a phase of the AC control voltage with respect to a voltage induced across each of the generating coils is a lagging or delay phase or the phase is delayed with respect to a phase of the induced voltage during no-load of the magneto, magnetic flux interlinking the generating coil is increased, increasing an output of the magneto and increasing the input torque to the magneto. On the other hand, when a phase of the AC control voltage with respect to a voltage induced across each of the generating coils is a leading or advance phase or the phase is advanced with respect to a phase of the induced voltage during no-load of the magneto, magnetic flux interlinking the generating coil is decreased, decreasing an output of the magneto, and reducing an input torque to the magneto.

Thus, when the voltage accumulating means is incorporated in the load, arranging the means for applying the AC control voltage from the voltage accumulating means to each of the generating coils to vary a phase of the control voltage with respect to the induced voltage during no-load of the generating coil leads to a variation in magnetic flux interlinking the generating coil, and permits an output of the magneto or input torque thereof to be varied. Thus, controlling the phase of the control voltage while using specific characteristics of the magneto as the controlled characteristics permits controlling wherein the controlled characteristics are desired characteristics to be attained.

As described above, the present invention permits characteristics of the magneto to be controlled by controlling a magnetic field acting on each of the generating coils, so that an output of the magneto may be controlled without short-circuiting an output of the magneto. Also, the present invention permits a variation in input torque of the magneto, so that input torque of the magneto may be controlled so as to reduce a burden on an internal combustion engine during low-speed operation of the engine, thereby enhancing acceleration performance of the engine.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 1 is a circuit diagram generally showing an embodiment of a generating apparatus according to the present invention;

FIGS. 4A to 4I are waveform diagrams showing a waveform of a position detection signal or an output signal of a position detector incorporated in the generating apparatus of FIG. 1 and a waveform of a drive signal generated on the basis of the position detection signal;

FIGS. 5A and 5B are waveform diagrams showing a phase current flowing in the generating apparatus of FIG. 1, a charging current of a battery and a waveform of a position detection signal at a U-phase;

FIG. 6 is a diagrammatic view showing operation of the present invention;

FIG. 10 is a graphical representation showing characteristics of a magneto when control of a magnet field does not take place;

FIGS. 11A to 11D are diagrammatic views showing a procedure of generating a drive signal for each of switch elements from a switch control unit incorporated in the present invention by way of example;

DETAILED DESCRIPTION OF THE PREFERRED EMBODIMENT

Figure 2:
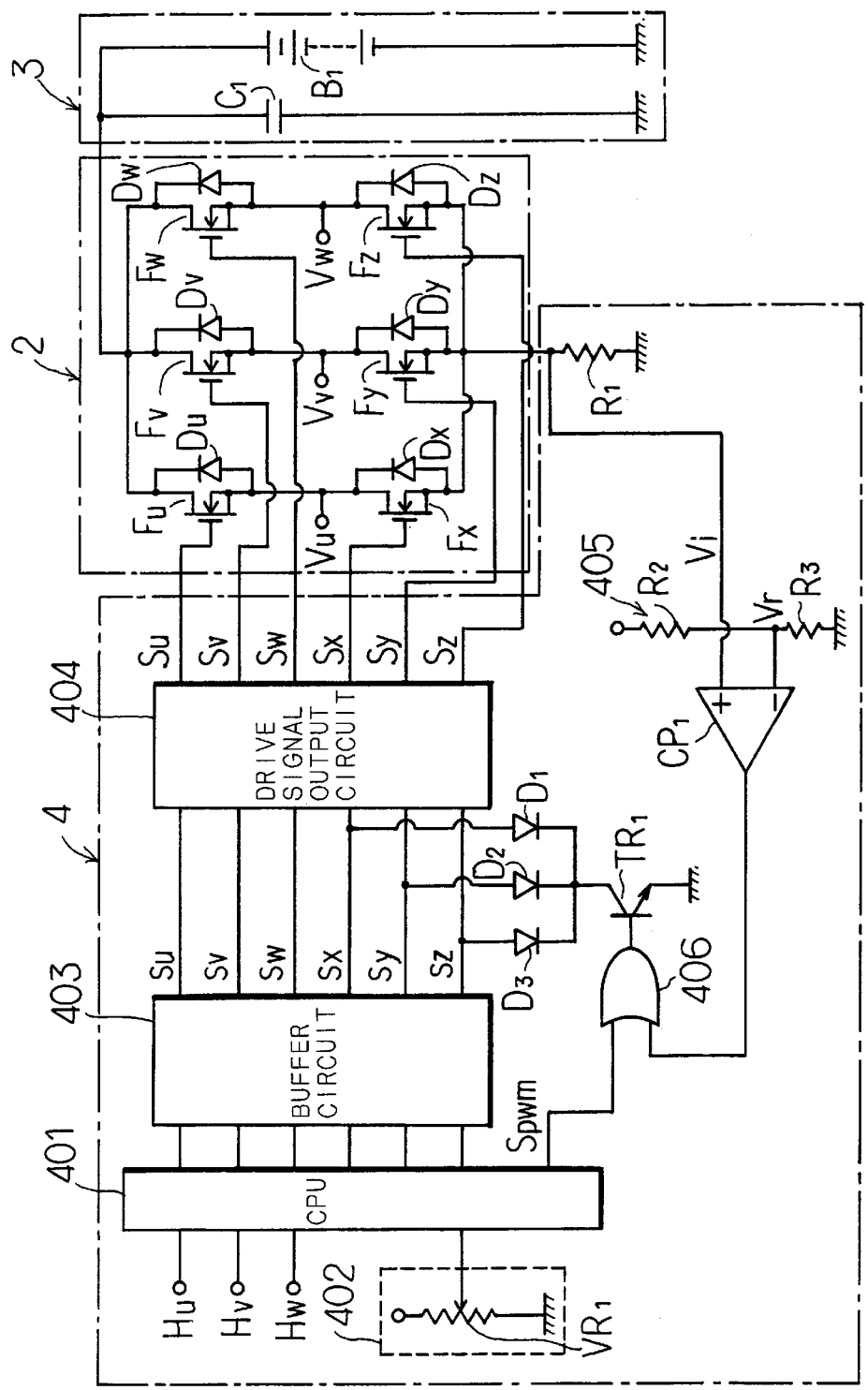
FIG. 2 is a circuit diagram showing a switch control unit incorporated in the generating apparatus of FIG. 1.

Now, a generating apparatus according to the present invention will be described hereinafter with reference to the accompanying drawings.

When an electric power is fed from a magneto mounted on an internal combustion engine to a lead including a voltage accumulating means such as a battery or the like (or, for example, when the battery is charged), generating coils are typically constructed into a multi-phase structure such as a three or more phase structure, so that an output of the multi-phase generating coils is fed through a diode bridge full-wave rectifying circuit to the load.

Referring first to FIG. 10, torque-rotational speed characteristics and charging current-rotational speed characteristics obtained when an electric power is fed through a rectifying circuit to a load including a battery by means of an output of a magneto mounted on an internal combustion engine for driving a vehicle are shown by way of example. In FIG. 10, reference character $\tau p$ designates input torque of the magneto acting as a generator, $\tau E$ is output torque of the engine obtained when a throttle valve is fully open, $\tau E'$ is output torque of the engine obtained when the throttle valve is somewhat closed, R is a travel resistance of the vehicle, Ic is a charging current of the battery (or an output current of the generator), and N is a rotational speed (rpm) of the engine.

Supposing that the throttle valve is fully open for starting the vehicle when the magneto exhibiting such characteristics as shown in FIG. 10 is mounted on the internal combustion engine for driving the vehicle, torque required for running of the vehicle is $R+\tau p+\tau o$, wherein $\tau o$ indicates torque required to permit the vehicle to travel while overcoming a mechanical loss of each of the engine and vehicle. Thus, when inertia and an angular velocity are indicated at J and $\Omega$, respectively, torque $\tau$ required for acceleration is represented by the following expression (1):

$$\tau = J \cdot (d\Omega/dt) = \tau E - (R + \tau p + \tau o) \quad (1)$$

When starting operation of the vehicle is carried out while keeping the throttle valve fully open, the vehicle is provided with angular acceleration due to the torque given by the expression (1), resulting in being accelerated. When a rotational speed of the engine approaches a target value, a driver throttles the throttle valve, so that torque of the engine is reduced as indicated at $\tau E'$ in FIG. 10, leading to balancing of the torque $\tau T'$ with the torque required, resulting in a velocity of the vehicle being settled at a certain rotational speed.

It will be noted from the equation (1) that acceleration performance of the vehicle is determined by a difference between the output torque $\tau E$ of the internal combustion engine during full opening of the throttle and the required torque $(R+\tau p+\tau o)$, resulting in the input torque $\tau p$ affecting the acceleration performance. Thus, it will be noted that if it is possible to suitably vary the input torque $\tau p$ of the magneto depending on traveling or running of the vehicle, control may be carried out in a manner to decrease the input torque of the generator as required, to thereby improve acceleration performance of the internal combustion engine.

Also, if it is possible to adjust output-rotational speed characteristics of the magneto to restrain an output of the magneto during a high-speed operation of the engine, flow of current in an excessive amount to the load may be prevented without using a regulator of the type that short-circuits an output of the magneto.

Unfortunately, in general, a magneto adapted to form a magnet field by means of a permanent magnet causes setting of a load to directly determines an output $VB \times IC$ thereof and concurrently determines a required input $K \times \tau p \times N$ thereof, wherein VB is an output voltage thereof and K is a constant. Thus, in the prior art, it was considered impossible to vary input torque-rotational speed characteristics of the magneto or output current-rotational speed characteristics thereof.

The present invention explodes the above-described theory established in the prior art and is constructed so as to permit adjustment of the input torque-rotational speed characteristics of the magneto and/or output current-rotational speed characteristics thereof, and thereby permits the generating apparatus to exhibit desired characteristics.

Referring next to FIG. 1, an essential part of an embodiment of a generating apparatus according to the present invention is illustrated. In FIG. 1, reference numeral 1 designates a magneto which includes a magnet rotor 1A and a stator 1B, 2 is a rectifying/switch circuit constituted of a full-wave rectifying circuit and a switch circuit of the inverter type, 3 is a load, and 4 is a switch control unit.

The magnet rotor 1A may be constructed in a manner widely known in the art and includes a fly wheel or rotor yoke made of iron and formed into a cup-like shape 101 and permanent magnets 102 and 103 fixed on an inner surface of a peripheral wall of the fly wheel 101. The fly wheel 101 is provided on a central portion of a bottom wall thereof with a boss (not shown), which is coupled to a revolving shaft of an internal combustion engine (not shown). The permanent magnets 102 and 103 are magnetized in a diametric direction of the fly wheel while rendering polarities thereof different from each other so that N and S magnetic poles appear on an inner periphery thereof and centers of the magnetic poles are defined in a manner to be spaced from each other at angular intervals of 180 degrees. The magnets thus arranged provide a magnet field of two poles. The magnets 102 and 103 each are formed so as to have an arcuate angle of each magnetic pole set or a polar arcuate angle to be about 180 degrees. In the illustrated embodiment, the magnet rotor 1A is driven by the internal combustion engine, resulting in being rotated in a clockwise direction in FIG. 1.

The stator 1B includes an armature core 104 having three salient-pole sections Pu, Pv and Pw radially arranged at angular intervals of 120 degrees and three-phase generating coils Lu to Lw wound on the salient-pole sections of the armature core 104, respectively. The generating coils Lu to Lw are subject to star connection.

The stator 1B is mounted on a stator mounting section provided on a casing of the internal combustion engine or the like and the salient-pole sections Pu to Pw each are formed on a distal end thereof with a pole face, which is arranged so as to be opposite to a magnetic pole of the magnet rotor 1A through a void of a predetermined size. In the illustrated embodiment, the pole face on the distal end of each of the salient-pole sections Pu to Pw has a polar arcuate angle set to be 60 degrees.

In FIG. 1, the armature core 104 has a central portion shown to be solid for the purpose of facilitating understanding of connection of the generating coils. However, actually, the armature core 104 is formed at the central portion thereof with a through-hole via which the revolving shaft of the engine or the revolving shaft of the magnet rotor is inserted.

The core 104 of the stator 1B is provided with position detectors hv, hw and hu in a manner to be in proximity to the distal end of the salient-pole sections Pu, Pv and Pw, respectively. The position detectors hv, hw and hu each may be a magnetic detecting element such as a hole IC or the like. The position detectors hu to hw each are adapted to detect a rotation angle position of a magnet field with respect to each of the generating coils Lu to Lw. In the illustrated embodiment, the position detectors hu, hv and hw are arranged at positions wherein a phase thereof is advanced by 90 degrees as an electrical angle from a central position of the pole surface of the salient-pole sections Pu, Pv and Pw, respectively.

The rectifying/switch circuit 2 includes a three-phase diode bridge rectifying circuit widely known in the art which is constructed by subjecting diodes Du to Dw and Dx to Dz to three-phase bridge connection, as well as switch elements Fu to Fw and Fx to Fz bridge-connected to the diodes Du to Dw and Dx to Dz of the rectifying circuit by reverse parallel connection, respectively. The switch elements Fu to Fw and Fx to Fz thus bridge-connected cooperate with each other to constitute a switch circuit.

Reverse parallel connection between the switch elements and the diodes means that the switch elements and diodes are connected in parallel to each other while rendering forward directions thereof different from each other. In the illustrated embodiment, the switch elements Fu to Fw and Fx to Fz each are constituted by a MOSFET, wherein the MOSFETs thus constituting the switch elements Fu to Fw and Fx to Fz are connected at a drain and a source thereof to a cathode and an anode of the diodes Du to Dw and Dx to Dz, respectively.

Also, the rectifying/switch circuit 2 is so constructed that a connection between the diodes Du and Dx, between the diodes Dv and Dy and between diodes Dw and Dz act as U-phase, V-phase and W-phase input terminals of the rectifying circuit, to which terminals of the U-phase, V-phase and W-phase generating coils opposite to neutral points thereof are connected, respectively.

In addition, a common connection of cathodes of the diodes Du to Dw and that of anodes of the diodes Dx to Dz act as an output terminal on a positive polarity side of the rectifying circuit or a positive-side output terminal thereof and an output terminal on a negative polarity side of the rectifying circuit or a negative-side output terminal thereof, respectively, between which the load 3 is connected.

In the rectifying/switch circuit 2 shown in FIG. 1, the switch circuit constituted by the bridge circuit of the switch elements Fu to Fw and Fx to Fz is in the form of a switch circuit of the inverter type like that widely used for converting a DC voltage or current into an AC voltage or current. This may be constructed in substantially the same manner as a driver circuit which is used to commutate a drive current to an n-phase armature coil in an n-phase brushless DC motor.

When a MOSFET is used as each of the switch elements in the rectifying/switch circuit 2 as shown in FIG. 2, bridge connection of the switch elements Fu to Fw and Fx to Fz causes parasitic diodes present in drain-source circuits of the MOSFETs to be bridge-connected, to thereby provide a full-wave rectifying circuit. In this instance, a diode bridge full-wave rectifying circuit may be constructed using the parasitic diodes of the MOSFETs respectively constituting the switch elements Fu to Fw and Fx to Fz as the diodes Du to Dw and Dx to Dz, respectively. Alternatively, the diode bridge full-wave rectifying circuit may be constructed by separately connecting the diodes Du to Dw and Dx to Dz to the drain-source circuits of the MOSFETs respectively constituting the switch elements Fu to Fw and Fx to Fz by reverse parallel connection.

Herein, the switch elements Fu to Fw and Fx to Fz are referred to as upper-side switch elements and lower-side switch elements of a bridge of the switch circuit, respectively. Likewise, the diodes Du to Dw and Dx to Dz are referred to as upper-side diodes and lower-side diodes of a bridge of the full-wave rectifying circuit, respectively.

The load 3 includes a battery B1 and a capacitor C1 connected in parallel across the battery B1. The parallel circuit thus constructed of the battery B1 and capacitor C1 is connected between output terminals of the rectifying circuit. In the illustrated embodiment, the battery B1 and capacitor C1 cooperate with each other to provide a voltage accumulating means.

The battery B1 is connected to a lamp, an ignition unit for the internal combustion engine, a DC constant-voltage power circuit for feeding an electric power to a control section of the generating apparatus of the illustrated embodiment, and the like.

The switch control unit 4 provides on-off control of the switch elements Fu to Fw and Fx to Fz constituting the switch circuit so as to apply a three-phase AC control voltage having a predetermined phase angle with respect to a voltage induced across each of the generating coils Lu to Lw from the voltage accumulating means incorporated in the load 3 through the switch circuit of the rectifying/switch circuit 2 to the generating coils Lu to Lw.

Thus, application of the AC control voltage from the voltage accumulating means included in the load through the switch circuit to the generating coils in the illustrated embodiment permits a voltage different between the voltage induced across each of the generating coils of the magneto 1 and the AC control voltage to flow a current to the load 3.

The term "induced voltage" or "voltage induced" used herein indicates a voltage induced across each of the generating coils Lu to Lw of the magneto 1.

The switch control unit 4 includes a switch pattern decision means and a switch drive circuit. The switch pattern decision means is adapted to decide or determine both a drive period and a non-drive period of each of the switch elements Fu to Fw and Fx to Fz constituting the switch circuit on the basis of a rotation angle position of a magnet field detected by the position detectors hu to hw so that specific characteristics of the magneto 1, which are defined to be "controlled characteristics", may be desired characteristics. The switch drive circuit functions to feed each of the switch elements Fu to Fw and Fx to Fz with a drive signal so that the switch elements are kept turned on and turned off during the drive period and non-drive period decided by the switch pattern decision means, respectively. Thus, the switch elements Fu to Fw and Fx to Fz are fed with drive signals Su to Sw and Sx to Sz, respectively.

The term "drive signal" used herein indicates a signal which is fed to a control terminal of each of the switch elements Fu to Fw and Fx to Fz in order to render the switch element turned on.

Also, the term "drive period" used herein indicates a period of time during which each of the switch elements is fed with the drive signal and the term "non-drive period" is a period during which each switch element is kept turned off while being kept from being fed with the drive signal.

In the illustrated embodiment, the switch element is not necessarily kept turned on during the whole "drive period". During the drive period, the drive signal may be interrupted at a predetermined duty ratio as required, to thereby provide a period during which the switch element is turned off.

The term "controlled characteristics of magneto" used herein indicates specific characteristics to be controlled out of the various possible characteristics such as output voltage-rotational speed characteristics of the magneto, output current-rotational speed characteristics thereof, input torque-rotational speed characteristics thereof and the like.

When output current-rotational speed characteristics of the magneto 1 are to be controlled as the controlled characteristics, the switch control unit 4 may be constructed as shown in FIG. 2. More specifically, in FIG. 2, reference numeral 401 designates a CPU of a microcomputer, which is fed with position detection signals Hu to Hw respectively outputted from the position detectors hu to hw, as well as an output of a controller 402 for generating an output current indication signal providing an indication value of the output current fed to the load. The output current is the charging current of the battery B1.

The controller 402 shown in FIG. 2 is constituted by a variable resistor VR1 having a voltage of a constant level applied thereto from a DC constant voltage power circuit (not shown), so that a voltage signal obtained by subjecting a DC constant voltage to voltage dividing by means of the variable resistor VR1 may be fed in the form of an output current indicating signal to an analog input port of the CPU 401.

The CPU 401 has output terminals arranged in correspondence to the switch elements Fu to Fw and Fx to Fz of the switch circuit, to thereby output drive command signals su to sw and sx to sz for commanding turning-on of the switch elements Fu to Fw and Fx to Fz from the output terminals through a buffer circuit 403 to the switch elements Fu to Fw and Fx to Fz, respectively. Then, the drive command signals su to sw and sx to sz are fed to a drive signal output circuit 404. The drive signal output circuit 404 has input terminals to which the drive command signals su to sw and sx to sz are inputted and output terminals connected to control terminals of the switch elements Fu to Fw and Fx to Fz; so that when the drive command signals su to sw and sx to sz are generated, the drive signals Su to Sw and Sx to Sz are fed to the control terminals of the switch elements Fu to Fw and Fx to Fz, respectively. In the illustrated embodiment, the control terminal of each of the switch elements Fu to Fw and Fx to Fz is constituted by a gate of the FET.

In the illustrated embodiment, feeding the drive signals to the switch elements Fu to Fw and Fx to Fz permits each of the switch elements Fu to Fw and Fx to Fz to be subject to on-off operation at a predetermined timing, thereby permitting adjustment of both a phase and a magnitude (average value) of an AC control voltage applied from the voltage accumulating means incorporated in the load and constituted of the battery 1 and capacitor C1 in the illustrated embodiment to the generating coils Lu to Lw of the magneto 1.

In order to detect a current flowing from the load 3 to the FETs constituting the switch circuit, a resistor R1 for current detection is connected between ground and a common connection of anodes of the diodes Dx to Dz constituting the lower-side of the bridge of the diode bridge full-wave rectifying circuit, so that a current detection signal Vi appearing across the resistor R1 is fed to a non-inversion input terminal of a comparator CP1.

Reference numeral 405 designates a reference voltage generating circuit for dividing an output voltage of the above-described DC constant voltage power circuit (not shown) by means of a voltage dividing circuit constituted by a series circuit of resistors R2 and R3 to generate a reference voltage Vr across the resistor R3. The reference voltage Vr is then inputted to an inversion input terminal of the comparator CP1.

The buffer circuit 403 has output terminals connected to input terminals of the drive signal output circuit 404. Of the output terminals, the terminals through which the drive command signals sx, sy and sz (which command turning-on of the lower-side switch elements Fx to Fz of the bridge of the switch circuit) are outputted have anodes of diodes D1, D2 and D3 connected thereto. The diodes D1 to D3 have cathodes connected together at a common connection. The common connection of the cathodes of the diodes D1 to D3 is connected to a collector of an NPN transistor TR1 of which an emitter is grounded, so that during a period of time for which the transistor TR1 is kept turned on, the drive command signals sx, sy and sz are bypassed from the drive signal output circuit 404 through the transistor TR1 to prevent the drive signals Sx to Sz from being fed to the lower-side switch elements Fx to Fz of the bridge of the switch circuit.

The transistor TR1 has a base fed with a PWM signal Spwm from the CPU 401 through an OR circuit 406 and fed with an output of the comparator CP1 through the OR circuit 406. The PWM signal Spwm is a signal of a pulse shape which is held at a low or "0" level during a period of time for which the switch elements Fx to Fz are kept turned on and held at a high or "1" level during a period of time for which the switch elements Fx to Fz are kept turned off.

When a current flowing through the switch elements Fu to Fw and Fx to Fz constituting the switch circuit is below a set level and an output of the comparator CP1 is kept at a low or "0" level, the transistor TR1 is kept turned on during a period of time for which the PWM signal Spwm is held at the high level, to thereby prevent the drive command signals sx to sz from being fed to the drive signal output circuit 404. The transistor TR1 is kept turned off while the PWM signal is held at the low level, to thereby permit the drive command signal sx to sz to be fed to the drive signal output circuit 404. This results in the switch elements Fu to Fw and Fx to Fz, which function to apply a control voltage from the battery B1 of the load 3 to the generating coils Lu to Lw, being on-off controlled at predetermined duty ratios.

When a current flowing from the battery B1 through the switch elements Fu to Fw and Fx to Fz exceeds a limited level, the current detection signal Vi exceeds the reference voltage signal Vr, resulting in an output of the comparator CP1 being reversed to a high level, so that the transistor TR1 may be held turned on. This keeps the switch elements Fx to Fz from being fed with the drive signals Sx to Sz, so that the switch elements Fx to Fz are kept turned off. This prevents a current from flowing to the switch circuit constituted of the switch elements Fu to Fw and Fx to Fz, to thereby keep the switch elements Fu to Fw and Fx to Fz from being damaged or broken by excessive current.

In the switch control unit shown in FIG. 2 by way of example, the buffer circuit 403 and drive signal output circuit 404 cooperate with each other to provide a switch drive circuit. The diodes D1 to D3, transistor TR1 and OR circuit 406 cooperate together to constitute a duty control circuit. Also, the current detection resistance R1, comparator CR1, and resistors R2 and R3 cooperate together to provide an overcurrent protection circuit. Thus, the switch control unit 4 is constructed of the switch drive circuit, duty control circuit and overcurrent protection circuit, as well as the CPU 401 and controller 402.

The CPU 401 is fed with the position detection signals Hu to Hw from the position detectors hu to hw, to thereby generate the drive signals Su to Sw and Sx to Sz for turning on the switch elements Fu to Fw and Fx to Fz at predetermined timings.

Supposing that the permanent magnets 102 and 103 each have a polar arcuate angle of 180 degrees and each of the position detector hu to hw outputs a signal at a high level when it detects the N pole, under the conditions that the position detectors hu to hw are arranged in such a manner as shown in FIG. 1; the position detection signals Hu to Hw generated by the position detectors hu to hw have waveforms as shown in FIGS. 4A to 4C, wherein θ on an axis of abscissas indicates a rotation angle of the rotor. The position detection signals Hu to Hw are successively generated at phase differences of 120 degrees in electrical angle. In the illustrated embodiment, the rotor has a two-pole structure, so that magnetic flux interlinking each of the generating coils Lu to Lw and an electrical angle of a voltage induced across each generating coil coincide with a mechanical angle. The electrical angle is a phase angle on a waveform of each of the magnetic flux and induced voltage and the mechanical angle is a phase angle represented by a rotation angle of the rotor. Also, in the illustrated embodiment, the position detectors hu to hw are arranged at positions in which a phase is advanced by 90 degrees with respect to a center of the U-phase to W-phase magnetic poles of the stator, respectively, so that periods of time during which the position detectors Hu to Hw are kept at a low level and a high level coincide with a period of one of half cycles of voltages induced across the U-phase to W-phase generating coils Lu to Lw and a period of the other half cycle, respectively. For example, a period of time during which the position detection signal Hu is kept at a low level coincides with a period of a positive half cycle of a voltage induced across the U-phase generating coil Lu and a period of time during which the position detection signal Hu is kept at a high level coincides with a period of a negative half cycle of the voltage induced across the U-phase generating coil Lu.

In this instance, supposing that on-off control of the switch elements constituting the switch circuit is carried out in a 180-degree switching control manner or in a manner to keep the switch elements turned on during a period of 180 degrees in electrical angle and turned off during the remaining 180-degree period, a reference switching pattern for the switch elements Fu to Fw and Fx to Fz may be determined as shown in FIGS. 4D to 4I.

FIGS. 4D to 4I show reference switch patterns of the switch elements Fu to Fw and Fx to Fz in the form of waveforms of the drive signals Su to Sw and Sx to Sz fed to the switch elements, respectively, wherein the drive signals Su to Sw and Sx to Sz are indicated by rectangular waveform signals of a high level, respectively. A period of time during which the drive signals Su to Sw and Sx to Sz are generated is a drive period of the switch elements Fu to Fw and Fx to Fz and a period of time for which the drive signals Su to Sw and Sx to Sz are kept from being generated is a non-drive period of the switch elements Fu to Fw and Fx to Fz.

In the reference switch pattern for 180-degree switching control shown in FIGS. 4D to 4I, a period of time during which the position detection signals Hu to Hw generated from the position detectors hu to hw for detecting a rotation angle position of a magnet field with respect to each of the U-phase to W-phase generating coils Lu to Lw each are kept at a high level (or a period of time during which each of the position detectors detects one of magnetic poles of the magnet field) is defined to be a non-drive period of each of the corresponding upper-side switch elements Fu to Fw of the bridge of the switch circuit. Also, a period of time during which the position detectors Hu to Hw each are kept at a low level is defined to be a drive period of each of the corresponding upper-side switch elements Fu to Fw of the bridge of the switch circuit. Further, a non-drive period of each of the upper-side switch elements Fu to Fw of the bridge of the switch circuit (or a period of time during which the position detectors hu to hw each detect the other magnetic pole of the magnet field) is defined to be a drive period of each of the corresponding lower-side switch elements Fx to Fz of the bridge. The drive period of each of the upper-side switch elements Fu to Fw of the bridge is defined to be a non-drive period of each of the corresponding lower-side switch elements Fx to Fz of the bridge.

On-off operation of the switch elements Fu to Fw and Fx to Fz in such reference switch patterns as shown in FIGS. 4D to 4I permits an AC control voltage of the same phases as a voltage induced across the generating coils Lu to Lw of the magneto to be applied from the voltage accumulating means incorporated in the load 3 through the switch circuit constituted of the switch elements Fu to Fw and Fx to Fz to the generating coils Lu to Lw. In the illustrated embodiment, the voltage accumulating means is mainly constituted by the battery B1.

In the illustrated embodiment, phases of the switch patterns of the switch elements Fu to Fw and Fx to Fz are varied on the basis of the reference switch patterns shown in FIGS. 4D to 4I, so that a phase of the PC control voltage applied from the load through the switch circuit to the generating coils with respect to the voltage induced across each of the generating coils is varied from a leading or advance phase to a lagging or delay phase. This causes the amount of magnetic flux interlinking the generating coils to be increased or decreased, leading to a variation in characteristics of the magneto.

The term "phase" or "phase angle" of the AC control voltage which will be referred to hereinafter indicates a phase or phase angle of the AC control voltage with respect to a voltage induced across the magneto during no-load which is determined depending on positional relationship between the stator of the magneto and the rotor thereof.

As described above, in the illustrated embodiment, the switch elements Fu to Fw and Fx to Fz are connected to the diodes Du to Dw and Dx to Dz constituting the diode bridge full-wave rectifying circuit for rectifying a current fed from the magneto 1 to the load 3 by reverse parallel connection, thereby permits the switch circuit to be constituted by the bridge circuit of the switch elements Fu to Fw and Fx to Fz. This arrangement permits control over timing of on-off operation of the switch elements Fu to Fw and Fx to Fz, leading to controlling of a phase of an AC control voltage applied from the load to the generating coils. The construction of the illustrated embodiment permits a magnetic field acting on the generating coils of the magneto to be synthesized of a rotation magnetic field generated with rotation of the magnet field and a magnetic field for control generated from the generating coils depending on a control current flowed due to the AC control voltage, leading to a variation in various characteristics of the magneto.

When a phase of the AC control voltage is delayed or lagged with respect to a voltage induced across each of the generating coils during no-load, the amount of magnetic flux which tends to increase magnetic flux flowing through the core on which the generating coils are wound is increased, leading to an increase in output of the magneto, as well as an increase in input torque of the magneto. On the other hand, advance of the phase with respect to the induced voltage during no-load causes a decrease in amount of the magnetic flux, leading to a reduction in both output of the magneto and input torque.

In the generating apparatus shown in FIG. 1, phase currents Iu, Iv and Iw flowing through the generating coils Lu, Lv and Lw and negative half cycles Iu', Iv' and Iw' of the phase currents inverted by the full-wave rectifying circuit have such waveforms as shown in FIG. 5A.

In the generating apparatus constructed as shown in FIGS. 1 and 2, when 180-degree switching control is carried out at such switching patterns as shown in FIGS. 4D to 4I, division of the switch elements constituting the switch circuit into the upper-side switch elements Fu to Fw and lower-side switch elements Fx to Fz of the bridge permits one of the switch elements of one of the upper and lower sides to be kept turned on and two of the switch elements of the other side to be kept turned on.

Figure 3A:
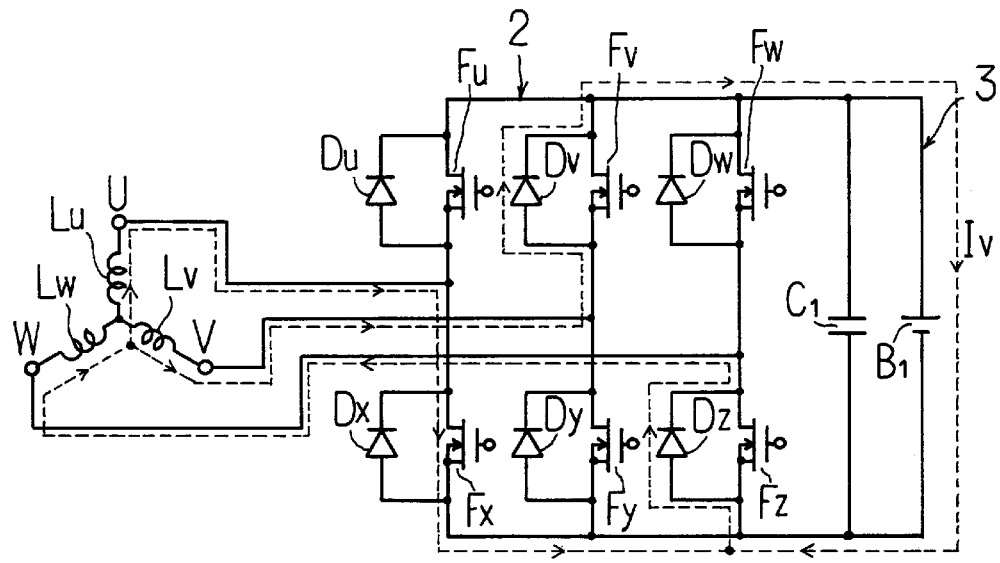
FIGS. 3A to 3F are circuit diagrams showing operation of the generating apparatus shown in FIG. 1.
Figure 3B:
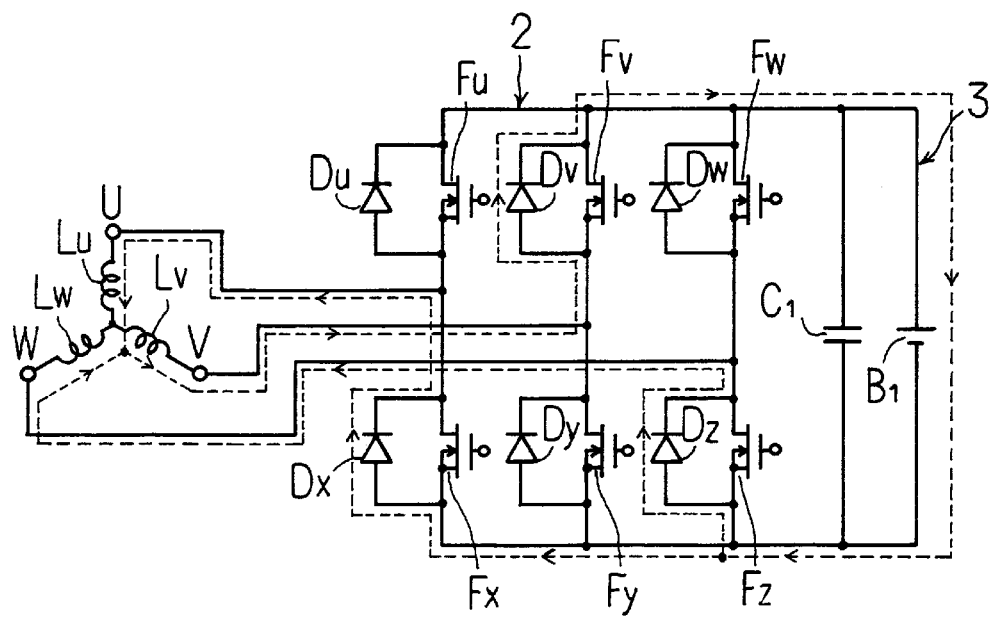

Considering a period T1 shown in FIG. 5B by way of example, the upper-side switch element Fv and the lower-side switch elements Fx and Fz are kept turned on during the period T1. Under such conditions, when a phase voltage at the U phase is in a positive half-cycle, the phase current Iu at the U phase is returned from the generating coil Lu through the switch element Fx and diode Dz and also through the generating coil Lw as indicated by broken lines in FIG. 3A, to thereby be kept from flowing to the output side. Thus, it is only the current Iv at the V phase that flows from the rectifying/switch circuit to the load 3. Also, during the period T1 wherein the lower-side switch elements Fx and Fz are kept turned on, when a phase voltage at the U phase is in a negative half-cycle, the phase current Iv flowing out of the generating coil at the U phase is caused to flow through a path extending from the diode Dv through the load 3, diode Dx and generating coil Lw to the generating coil Lv, as well as a path extending from the diode Dv through the load 3, diode Dz and generating coil Lw to the generating coil Lv, as indicated by broken lines in FIG. 3B. Thus, during the period T1 of FIG. 5B, only the phase current at the V phase is permitted to flow toward the load 3.

Likewise, during a period T2 in FIG. 5B wherein two upper-side switch elements Fv and Fw and one lower-side switch element Fx are kept turned on, the phase current Iu' at the U phase in a negative direction is caused to flow toward the load 3. Also, during a period T3 in FIG. 5B wherein one upper-side switch element Fw and two lower-side switch elements Fx and Fy are kept turned on, the phase current Iw at the W phase is caused to flow toward the load 3. During a period T4 in FIG. 5B wherein two upper-side switch elements Fu and Fw and one lower-side switch element Fy are kept turned on, the phase current Iv' at the V phase in a negative direction is caused to flow toward the load.

Thus, the phase current flowing toward the load 3 is changed over in order of Iv→Iu'→Iw→Iv'→Iu→Iw'→Iv at every time when a combination of the switch elements which are turned on is changed over. The phase currents thus changed over each flow in the form of a charging current Ic to the battery B1. The charging currents each have such a waveform as indicated at a thick line in FIG. 5A.

The illustrated embodiment, as described above, is constructed so that control over timings at which the switch elements of the switch circuit are subject to on-off operation permits a phase of an AC control voltage applied from the load to each of the generating coils or a phase thereof with respect to a voltage induced across each of the generating coils during no-load to be varied from an advance phase to a delay phase. Such construction results in a period of time during which a half-wave of the phase current at the phase flows in the form of a charging current to the load being varied with a variation in phase of the AC control voltage, so that the charging current may be increased or decreased with such a variation in period of time.

FIG. 6 shows, on the basis of data actually measured, a variation in period of time during which the charging current Ic flows which is obtained when a phase of the AC control voltage is varied in various manners. Supposing that a phase angle of the AC control voltage is zero, the charging current is caused to flow over a period t0 between a point "a" and a point "b" in FIG. 6. In this instance, supposing that a phase of the AC control voltage is an advance phase having an advance angle of 12 degrees, a period of time during which the charging current is permitted to flow is shifted to a left-hand side as compared with the case that the advance angle is zero, as indicated at t12 in FIG. 6. Also, supposing that a phase of the AC control voltage is a delay phase of which a lagging or delay angle is 12 degrees, a period of time during which the charging current flows is shifted to a right-hand side as indicated at t-12 in FIG. 6. Further, supposing that a phase of the AC control voltage is a delay phase of 24 and 36 degrees in delay angle, a period of time during which the charging current flows is further shifted to a right-hand side as indicated at t-24 and t-36 in FIG. 6.

In addition, advance of a phase of the AC control voltage causes a phase of the phase current to be shifted to a right-hand side and delay of the phase causes the phase to be shifted to a left-hand side, although this is not shown in FIG. 6.

Thus, it will be noted that shift of a phase angle of the AC control voltage to the advance side causes a reduction in charging current and shift thereof to a delay side causes an increase in charging current.

Figure 7:
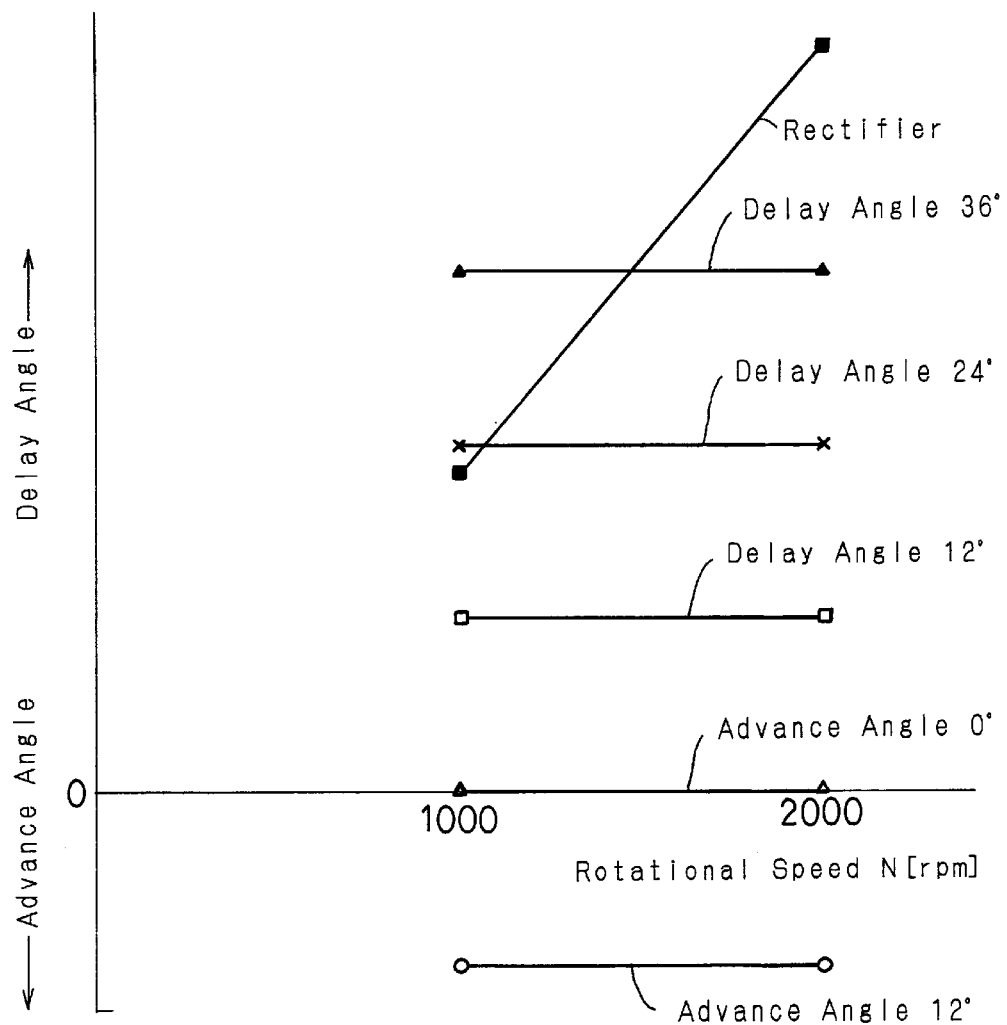
FIG. 7 is a diagrammatic view showing relationship between a rotational speed and a variation in phase of a phase voltage which is obtained when a phase of an AC control voltage is varied.

Also, a variation in phase of a phase voltage with respect to the rotational speed which is obtained in the generating apparatus shown in FIG. 1 when the rectifying/switch circuit 2 is functioning only as the diode bridge full-wave rectifying circuit while keeping all the switch elements Fu to Fw and Fx to Fz turned off and when the switch elements of the switch circuit are subject to on-off control to widely vary phases of the AC control voltage with respect to the induced voltage is shown in FIG. 7.

In FIG. 7, a straight line "Rectifier" indicates a variation in phase of the phase voltage with respect to the rotational speed obtained when the rectifying/switch circuit 2 is functioning only as the full-wave rectification circuit while keeping all the switch elements of the rectifying/switch circuit 2 turned off. Also, in FIG. 7, straight lines "Advance Angle 0°" and "Advance Angle 12°" indicate variations in chase of the phase voltage to the rotational speed obtained when a phase of the AC control voltage with respect to a voltage induced across the magneto during no-load is an advance phase in which an advance or leading angle is 0 degree and 12 degrees, respectively. Straight lines "Delay Angle 12°", "Delay Angle 24°" and "Delay Angle 36°" indicate variations in phase of the phase voltage to the rotational speed obtained when a phase of the AC control voltage with respect to the induced voltage is a delay phase in which a delay or lagging angle is 12 degrees, 24 degrees and 36 degrees, respectively.

As will be noted from FIG. 7, a delay in phase of the phase voltage at the rotational speed of 1000 rpm is increased when a delay phase angle of the AC control voltage with respect to a voltage induced across the magneto during no-load is 36 degrees as compared with the situation in which the rectifying/switch circuit 2 functions only as the rectifying circuit. In this instance, supposing that a phase of a voltage induced across each of the generating coils is identical with a phase of the phase voltage obtained when the rectifying/switch circuit 2 functions only as the rectifying circuit, a delay in phase voltage is increased when a phase of the AC control voltage with respect to a voltage induced across each of the generating coils of the magneto during no-load is a delay phase in which a delay angle is 36 degrees as compared with when the AC control voltage is not applied; so that a current flowing through the load due to a voltage difference between the induced voltage and the AC control voltage is advanced when the AC control voltage in which a delay angle is 36 degrees is applied as compared with when the control voltage is not applied. Thus, application of the control voltage of a delay phase increases the amount of magnetic flux which tends or acts to increase magnetic flux passing through the core of the magneto as compared with when no control voltage is applied, leading to an increase in charging current.

On the other hand, when the rotational speed is increased, a phase of the phase voltage is linearly delayed when no AC control voltage is applied and is not substantially varied when the AC control voltage delayed in phase by 36 degrees with respect to the induced voltage is applied. Thus, an increase in rotational speed causes a phase of the phase voltage to be relatively advanced when the AC control voltage is applied as compared with when it is not applied, resulting in the amount of magnetic flux which tends to contribute to an increase in magnetic flux flowing through the core of the magneto being decreased. Thus, an increase in rotational speed leads to a reduction in charging current Ic fed from the rectifying/switch circuit 2 to the battery B1.

Figure 8A:
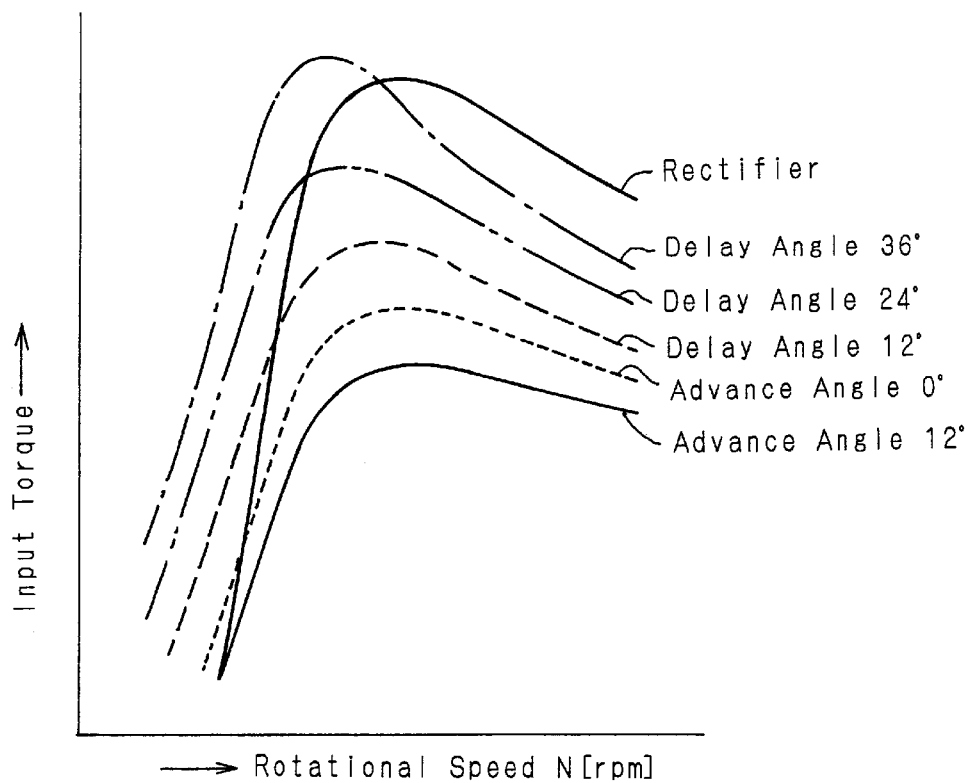
FIG. 8A is a graphical representation showing the relationship between input torque of the generating apparatus of FIG. 1 and rotational speed by way of example wherein a phase angle of an AC control voltage is used as a parameter.
Figure 8B:
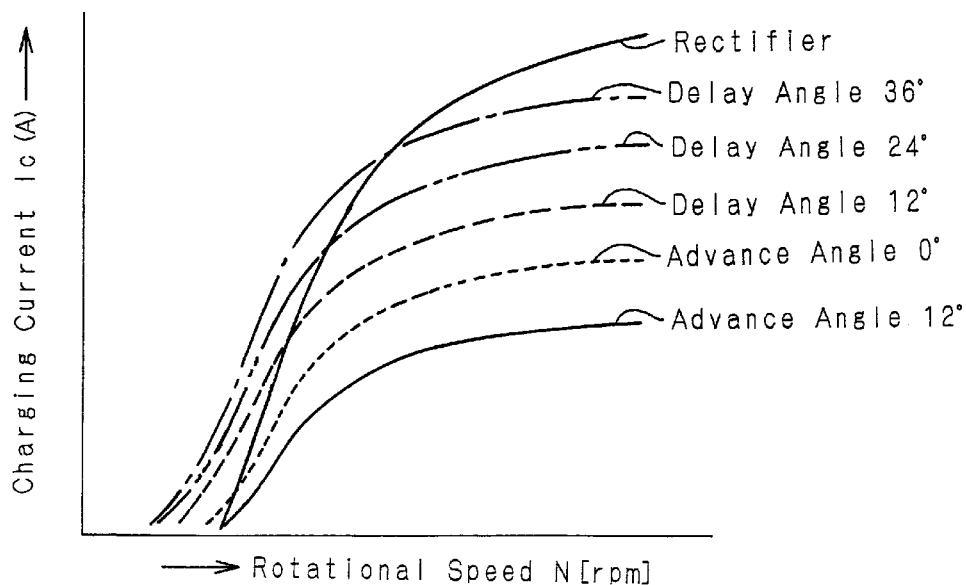
FIG. 8B is a graphical representation showing the relationship between a load current (charging current) of the generating apparatus of FIG. 1 and rotational speed by way of example wherein a phase angle of an AC control voltage is used as a parameter.

Results of measurement of characteristics of the charging current Ic flowing to the battery B1 of the load with respect to the rotational speed N, which was carried out while widely varying a phase angle of the AC control voltage with respect to the induced voltage, are shown in FIG. 8B by way of example. FIG. 8B indicates that an advance in phase of the AC control voltage leads to a decrease in charging current, whereas a delay in the phase increases the charging current.

A variation in phase angle of the AC control voltage leads to a variation in input torque of the magneto. The reason will be described hereinafter.

When the AC control voltage is delayed with respect to a voltage induced across the magneto during no-load at any rotational speed, the induced voltage is increased, to thereby increase the phase current, resulting in input torque of the magneto being increased correspondingly.

In a low rotational speed region, a phase of the phase current is advanced when a phase of the AC control voltage is a delay phase as compared with when a phase of the AC control voltage with respect to a voltage induced across the magneto during no-load is an advance phase, so that force in a reverse rotation direction is applied to the magneto from an initial stage, resulting in the input torque being required in a larger amount when a phase of the AC control voltage is a delay phase.

On the other hand, an increase in rotational speed causes a difference in phase current between when a phase of the AC control voltage is an advance phase and when it is a delay phase to be less. Accordingly, in a high rotational speed region, a difference in input torque is essentially determined depending on a magnitude of the phase current on the basis of a level of a voltage induced across the generating coils. In the high rotational speed region, the phase current is delayed with an increase in rotational speed, resulting in a period of time during which force in the reverse rotation direction is applied to the magneto being reduced, so that the input torque is reduced also when a phase of the AC control voltage is a delay phase or, for example, the delay angle is 36 degrees as compared with the rectifying/switch circuit 2 is functioned only as the rectifying circuit. A variation in input torque with respect to the rotational speed N is shown in FIG. 8A by way of example.

As can be seen from the foregoing, controlling of timings at which the switch elements of the switch circuit are subject to on-off operation to control a phase angle of the AC control voltage permits an output of the magneto and input torque thereof to be varied. Alternatively, a variation in output and input torque of the magneto may be accomplished by carrying out duty control wherein the upper-side switch elements Fu to Fw or lower-side switch elements Fx to Fz are subject to on-off operation at a predetermined duty ratio Df while rendering a phase of the AC control voltage constant.

The duty ratio Df, when a drive period of the switch element determined depending on the switch pattern is indicated at T, and an on-period of the switch element and an off-period thereof are indicated at Ton and Toff, respectively, is given by the following expression:

$$Df = \{Ton/(Ton+Toff)\} \times 100 = (Ton/T) \times 100 \ (\%)$$

Now, a variation in path through which the charging current flows when the lower-side switch elements Fx to Fz of the switch circuit are subject to on-off operation at a predetermined duty ratio will be considered in connection with the period T1 in FIG. 5 during which the upper-side switch element Fv and lower-side switch elements Fx and Fz in the switch patterns shown in FIGS. 4D to 4I are kept turned on, by way of example.

In this instance, the period T1 may be further divided into the following four periods depending on an on-off state of the switch elements Fx and Fz, a difference between the U-phase voltage and the V-phase voltage, and both positive and negative polarities of the U-phase voltage:

Period (1): A period during which the switch elements Fx and Fz are kept turned off and the phase voltage at the U phase is kept increased as compared with the phase voltage at the V phase;

Period (2): A period during which the switch elements Fx and Fz are kept turned off and the phase voltage at the U phase is kept decreased as compared with the phase voltage at the V phase;

Period (3): A period during which the switch elements Fx and Fz are kept turned on and the phase voltage at the U phase is kept positive; and Period (4): A period during which the switch elements Fx and Fz are kept turned on and the phase voltage at the U phase is kept negative.

Figure 3C:
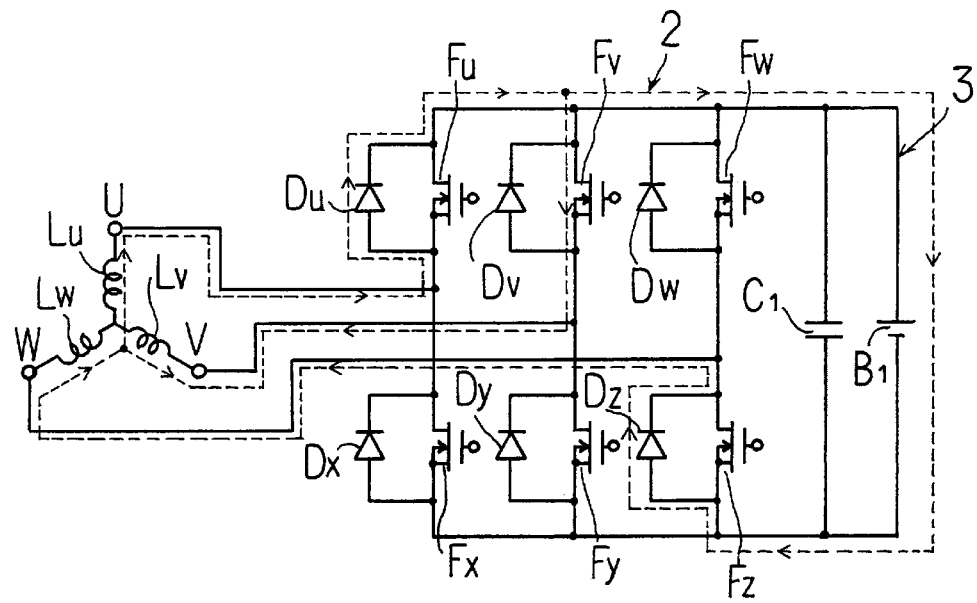
Figure 3D:
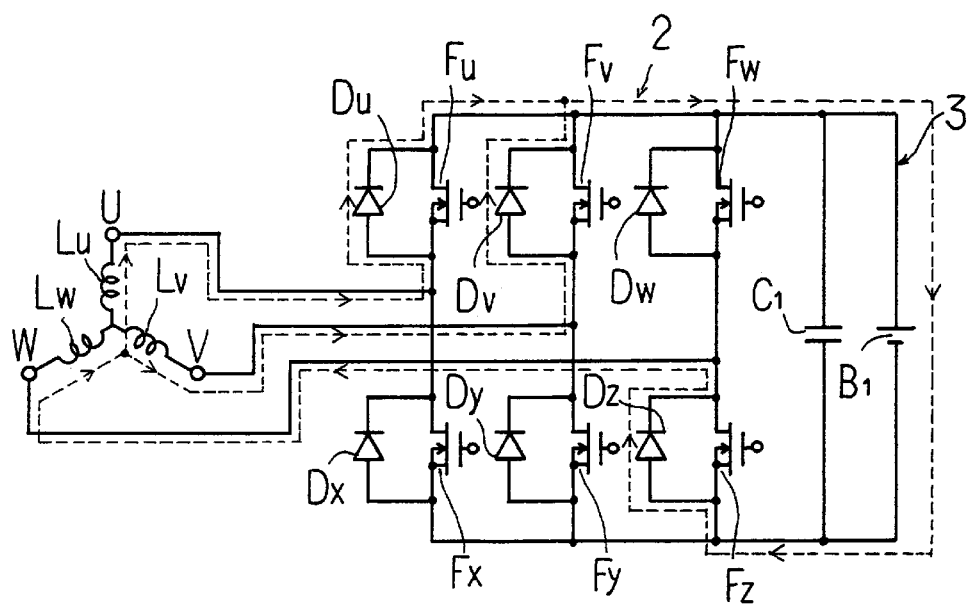

States of the switch circuit in the periods (1) to (4) are shown in FIGS. 3C to 3F. In the period (1), the phase voltage at the U phase is increased as compared with that at the V phase, so that a current which has flowed from the U phase through the upper-side diode Du of the bridge is permitted to flow through thee switch element Fv into the V phase, as shown in FIG. 3C. Thus, a current obtained by subtracting the current flowing into the V phase from the current flowing out of the U phase flows in the form of a charging current to the load.

Figure 3E:
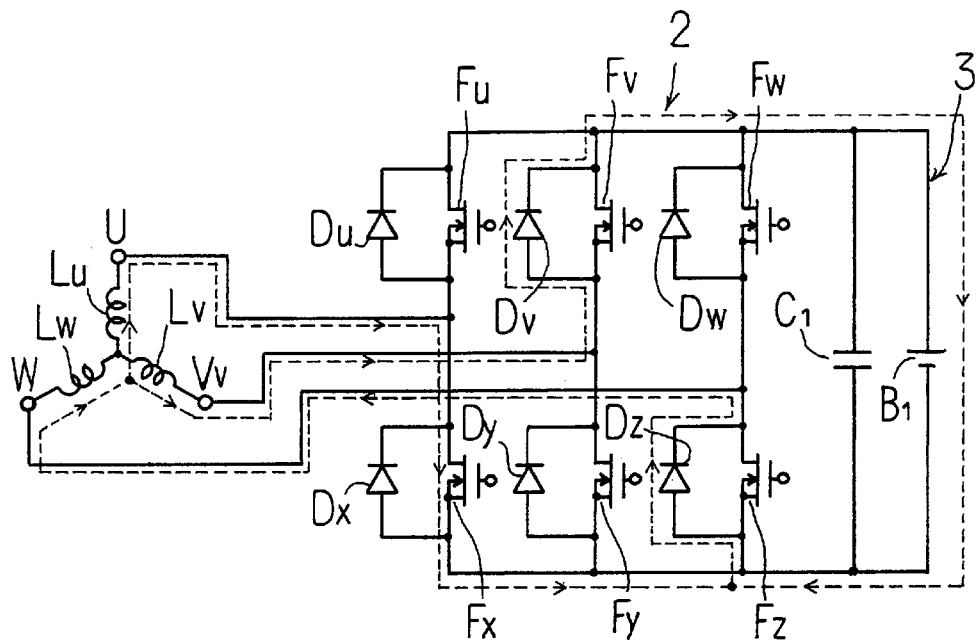

In the period (2), the phase voltage at the V phase is increased beyond that at the U phase, to thereby permit flowing of the charging current of a large magnitude like a charging current flowing through a conventional full-wave rectifying circuit, as shown in FIG. 3E.

In the period (3), the lower-side switch element Fx at the U phase is kept turned on, so that a voltage induced across the U phase is short-circuited through the switch element Fx and diode Dz, to thereby keep the phase current at the U phase from flowing to the battery B1, as shown in FIG. 3E. Thus, the phase current at the V phase is permitted to flow in the form of a charging current to the battery B1.

Figure 3F:
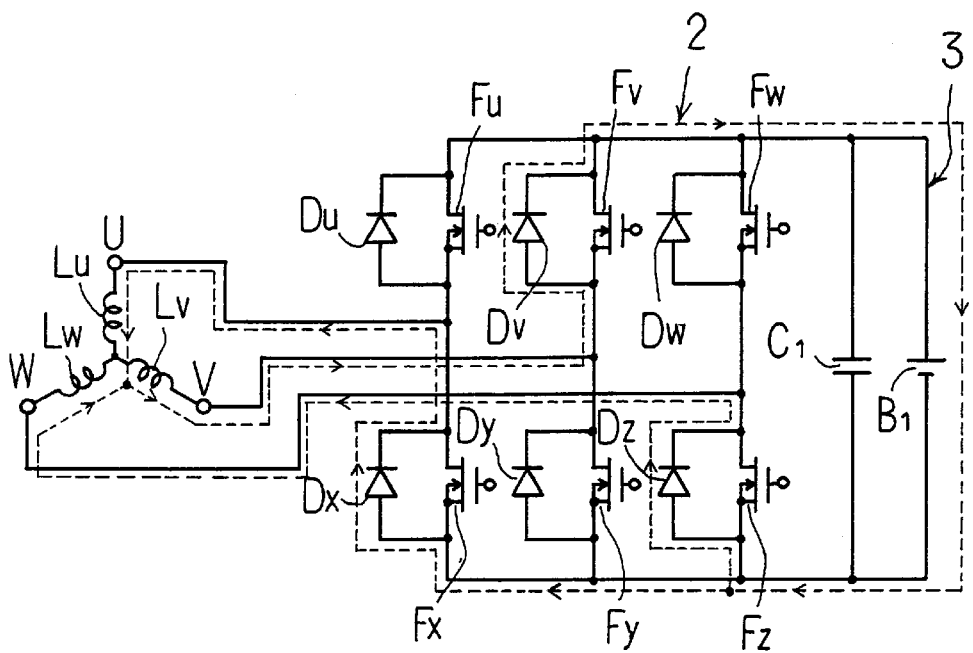

Further, in the period (4), the phase voltage at the U phase is rendered negative, therefore, the circuit is placed under substantially the same conditions as a rectifying circuit also when the switch elements Fv, Fx and Fz are kept turned on, to thereby permit flowing of the charging current of the same magnitude as a current flowing through the full-wave rectifying circuit, as shown in FIG. 3F.

On-off operation of the lower-side switch elements Fx to Fz of the bridge at a predetermined duty ratio permits a period of time during which the switch elements are kept turned off to be defined. The thus-defined period during which the switch elements Fx to Fz are kept turned off is placed under substantially the same conditions as those under which a current flows from the generating coils through the diode bridge full-wave rectifying circuit to the load, so that the charging current is increased as compared with when a duty ratio of each of the switch elements is 100%. The charging current is increased with a decrease in on-duty ratio of the switch elements. Also, the input torque is increased with an increase in charging current.

Figure 9A:
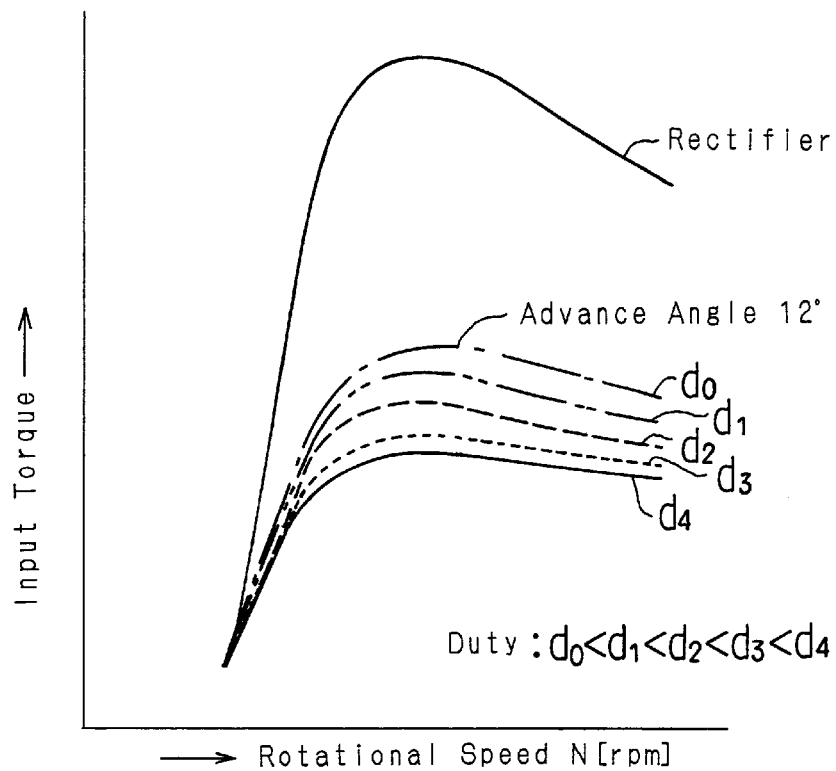
FIG. 9A is a graphical representation showing the relationship between input torque of the generating apparatus of FIG. 1 and a rotational speed by way of example wherein a duty ratio in duty control is used as a parameter.
Figure 9B:
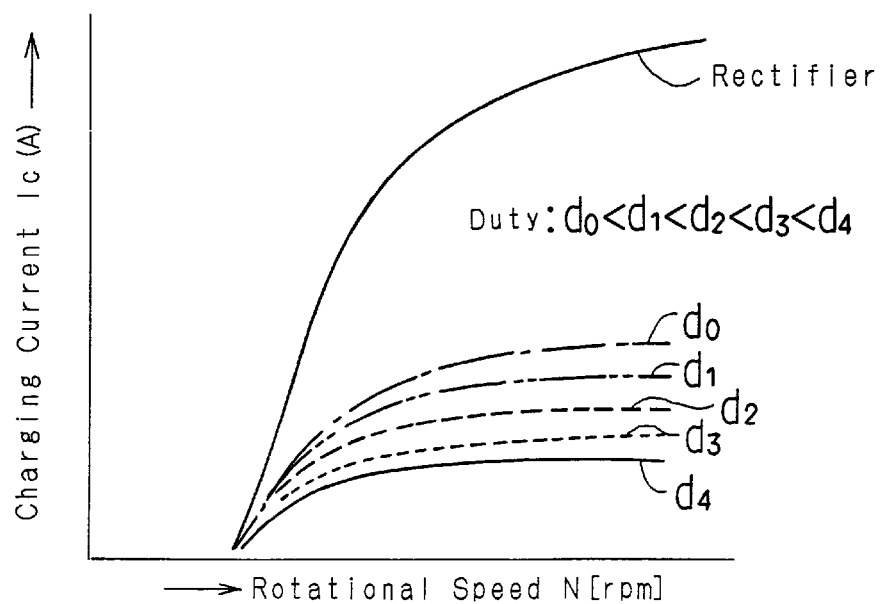
FIG. 9B is a graphical representation showing the relationship between a load current (charging current) of the generating apparatus of FIG. 1 and rotational speed by way of example wherein a duty ratio in duty control is used as a parameter.

Relationship between input torque of the magneto and the rotational speed N and between the charging current or an output current of the magneto and the rotational speed which are obtained under the conditions that relationship among duty ratios d0 to d4 of the lower-side switch elements of the bridge is d0<d1<d2<d3<d4 are shown in FIGS. 9A and 9B, respectively.

The illustrated embodiment, as described above, is constructed so that the lower-side switch elements of the bridge of the switch circuit are subject to on-off operation at predetermined duty ratios to carry out duty control thereof. Alternatively, the upper-side switch elements of the bridge may be subject to on-off operation at predetermined duty ratios, to thereby obtain the same results.

As described above, phase angle control of the AC control voltage permits a variation in both output characteristics and input torque characteristics of the magneto. Also, duty control of the lower-side or upper-side switch elements of the bridge of the switch circuit likewise leads to a variation in both output characteristics and input torque characteristics of the magneto.

Thus, either phase angle control of the AC control voltage or duty control of the upper-side or lower-side switch elements of the bridge of the switch circuit permits an output of the magneto or input torque thereof to be suitably controlled.

For example, in FIG. 2, a timing at which switching of each of the switch elements of the switch circuit is carried cut is varied depending on an output current indicating signal generated from the controller 2 or the upper-side or lower-side switch elements of the bridge are subject to duty control, so that an output current of the rectifying/switch circuit 2 fed to the load 3 may be controlled so as to have a magnitude corresponding to the output current indicating signal.

In this instance, a detection signal of the output current may be fed to the CPU 401, resulting in the phase angle control or duty control being carried out so that a deviation between an indicated value of the output current and a detected value thereof is rendered zero.

Also, the illustrated embodiment may be constructed in such a manner that the CPU 401 may be fed with an input torque reduction indicating signal which indicates a reduction in input torque of the magneto. Such construction permits phase angle control of the AC control voltage or duty control of the switch elements to be carried out so as to decrease input torque of the magneto, to thereby reduce input torque of the magneto, leading to a decrease in burden on the internal combustion engine.

For example, the magneto 1 may be mounted on an internal combustion engine for driving a conveyance such as a vehicle or the like. In this instance, when a situation that an enhancement in acceleration performance of the engine is required is detected as in start of the vehicle, the CPU 401 may be fed with the input torque reduction indicating signal, to thereby carry out phase angle control of the control voltage or duty control of the switch elements depending on the input torque reduction indicating signal, leading to a reduction in input torque of the magneto, resulting in enhancing the acceleration performance.

Phase angle control of the control voltage or duty control of the switch elements may be carried out so as to reduce input torque of the magneto when the internal combustion engine is at a low rotational speed and increase it when the rotational speed is increased, to thereby restrain a variation in rotational speed of the engine. Also, input torque of the magneto may be controlled so as to be increased during high speed operation of the engine, to thereby prevent overspeed rotation of the engine.

It would be considered that a timing at which switching of each of the switch elements of the rectifying/switch circuit 2 is carried out is varied by varying a position of mounting of each of the position detectors hu to hw while mounting the position detectors on a support rotatably arranged in a direction of rotation of the magneto or by carrying out predetermined operational processing by means of the CPU 401 to vary a position at which a drive signal of each of the switch elements is generated. The latter procedure is preferable because it enhances responsibility of the control and simplifies a mechanical structure of the magneto.

Now, the latter procedure of controlling a timing of switching of each of the switch elements by the CPU 401 to control a phase of the AC control voltage will be described by way of example.

When the position detectors hu to hw are arranged as shown in FIG. 1, a reference switch pattern which provides a reference drive period of each of the switch elements or a period of time during which each of the switch elements is fed with a drive signal and a reference non-drive period of each switch element or a period of time during which each switch element is kept turned off are initially determined on the basis of each of the position detection signals Hu to Hw. FIG. 11A shows the position detection signal Hu and FIG.

11B shows a switch pattern of the switch element Fu determined by the position detection signal Hu. In FIG. 11B, a period "ON" is a drive period and a period "OFF" is a non-drive period.

Also, under the conditions that boundary points t1 and t2 between the non-drive periods of each switch element and the drive points thereof each are defined to be a switching point of each switch element and the switching point in the reference switch pattern is defined to be an instrumentation start point, the actual switching point of each of the switch elements required for permitting the controlled characteristics of the magneto to be desired characteristics is operated in the form of a counted switching point value or a value counted by a timer between detection time of the instrumentation start point and detection time of the actual switching point.

For example, in FIG. 11, when the AC control voltage is delayed with respect to a voltage induced across the magneto during no-load, the switching point t1 at which the switch element is changed over from an OFF state to an ON state and the switch point t2 at which the switch element is changed over from an ON state to an OFF state in the reference switch pattern are defined to be an instrumentation start point for measuring a start point of the drive period and an instrumentation start point for measuring a start point of the non-drive period, respectively. In this situation, a value counted by the timer between each of the instrumentation start points and each of actual switching points ton and toff is operated in the form of a switching point counted value Td (see FIG. 11C).

Also, when the AC control voltage is advanced with respect to a voltage induced across the magneto during no-load, the switching point t2 at which the switch element is changed over from an ON state to an OFF state and the switch point t1 at which the switch element is changed over from an OFF state to an ON state in the reference switch pattern are defined to be an instrumentation start point for measuring a start point of the drive period and an instrumentation start point for measuring a start point of the non-drive period, respectively. In this situation, a value counted by the timer between each of the instrumentation start points and each of actual switching points ton' and toff' is operated in the form of a switching point counted value Td' (see FIG. 11D).

Then, when the switching point t1 of each switch element provided by the reference switch pattern (in the case that the control voltage is delayed) or the switching point t2 thereof (in the case that the control voltage is advanced) is detected, the switching point counted value of each of the switch elements thus operated is set in the timer, which then carries out counting operation. Then, when the timer completes the counting operation, the drive signal is generated for turning on the each switch element. Also, when the switching point t2 provided by the reference switch pattern (in the case that the control voltage is delayed) or the switching point t1 thereof (in the case that the control voltage is advanced) is detected, the counted value of the switching point of each switch element operated is set in the timer, which then carries out counting operation. Thereafter, when the timer completes, the drive signal for turning on each switch element is extinguished.

A program which permits the above-described processing to be executed by the CPU 401 is shown in FIGS. 12 to 16 by way of example.

Figure 12:
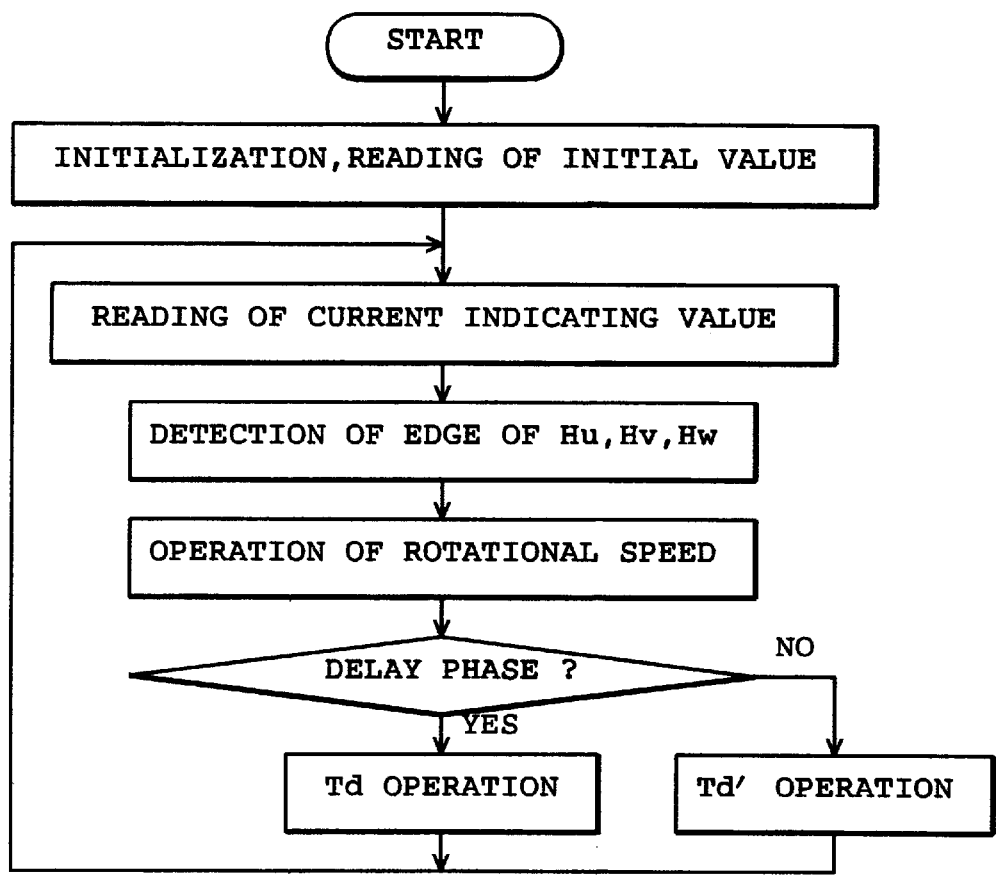
FIG. 12 is a flow chart showing an example of an algorithm of a main routine of a program executed by a microcomputer during generation of a drive signal by the procedure of FIG. 11.

FIG. 12 shows a main routine. In the main routine, first the CPU 401 initializes each of sections and reads an initial value of the switching point counted value Td or Td'. Then, it reads a current indicating value fed from the controller 402 to detect leading and trailing edges of each of the position detection signals Hu to Hw, to thereby operate a rotational speed of the magneto based on a signal width of the position detection signals Hu, Hv and Hw or intervals of generation thereof. Then, in order to permit the controlled characteristics to be desired characteristics, it is judged whether a phase of the AC control voltage is to be a delay phase or an advance phase. When it is judged that it should be a delay phase, the switching point counted value Td shown in FIG. 11C is operated using a man previously prepared and stored in a ROM; whereas when it should be an advance phase, the switching point counted value Td' shown in FIG. 11D is likewise operated.

Figure 13A:
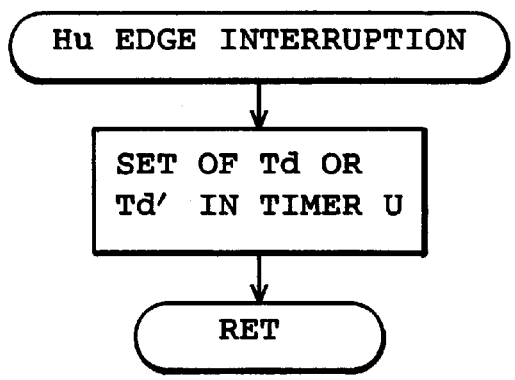
FIG. 13A is a flow chart showing an algorithm of an interruption routine of the program of FIG. 11 by way of example.
Figure 13B:
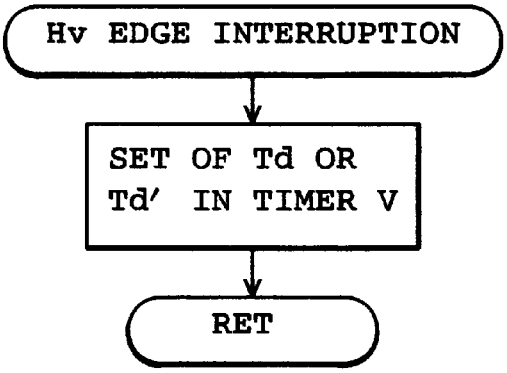
FIG. 13B is a flow chart showing an algorithm of another interruption routine of the program of FIG. 11 by way of example.
Figure 13C:
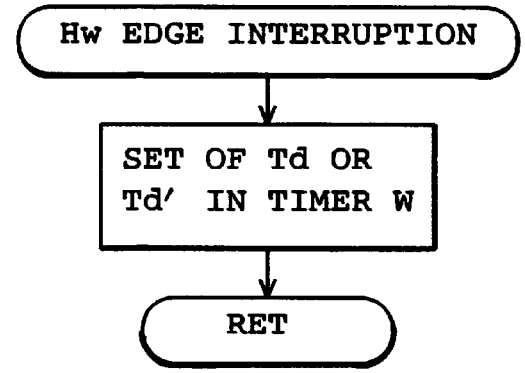
FIG. 13C is a flow chart showing an algorithm of a further interruption routine of the program of FIG. 11 by way of example.

Also, the CPU 401, every time when the leading or trailing edge of each of the position detection signals Hu to Hw is detected, executes each of interruption routines shown in FIGS. 13A, 13B and 13C and sets the switching point counted value Td or Td' operated as described above in timers U to W, followed by return to the main routine. The timers U to W start counting of the counted value simultaneously with setting of the counted value.

Figure 14:
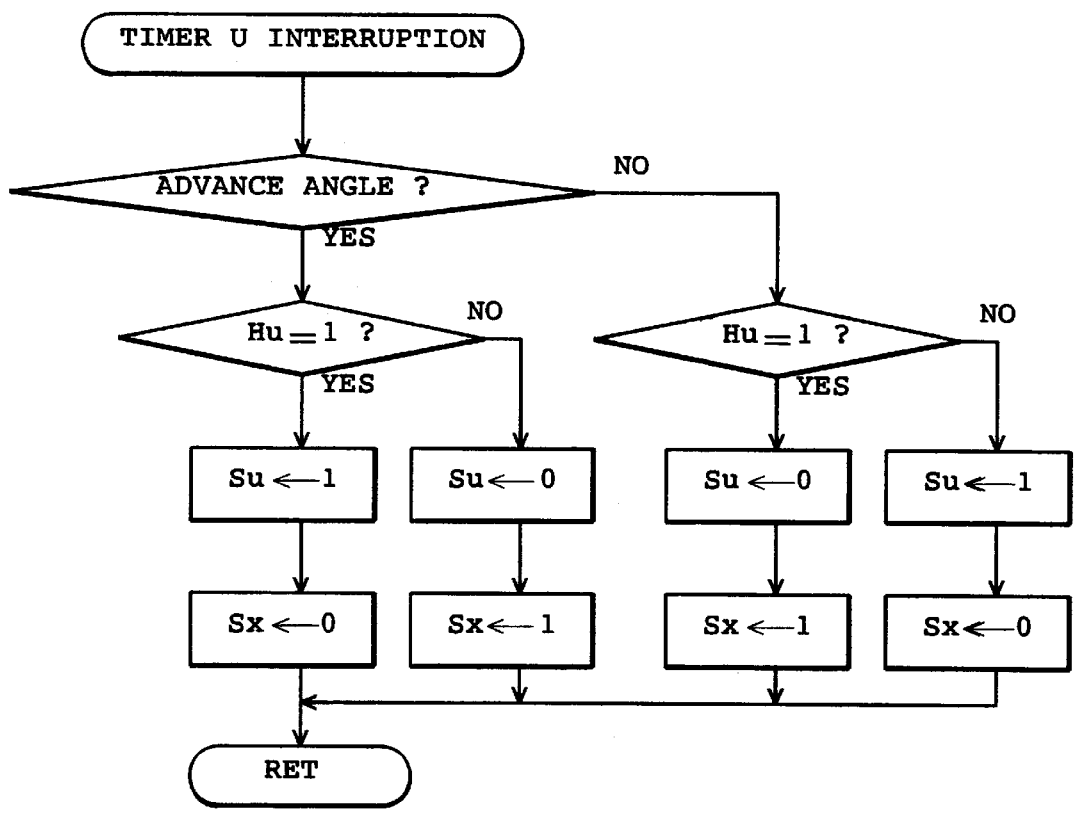
FIG. 14 is a flow chart showing an algorithm of still another interruption routine of the program of FIG. 11 by way of example.
Figure 15:
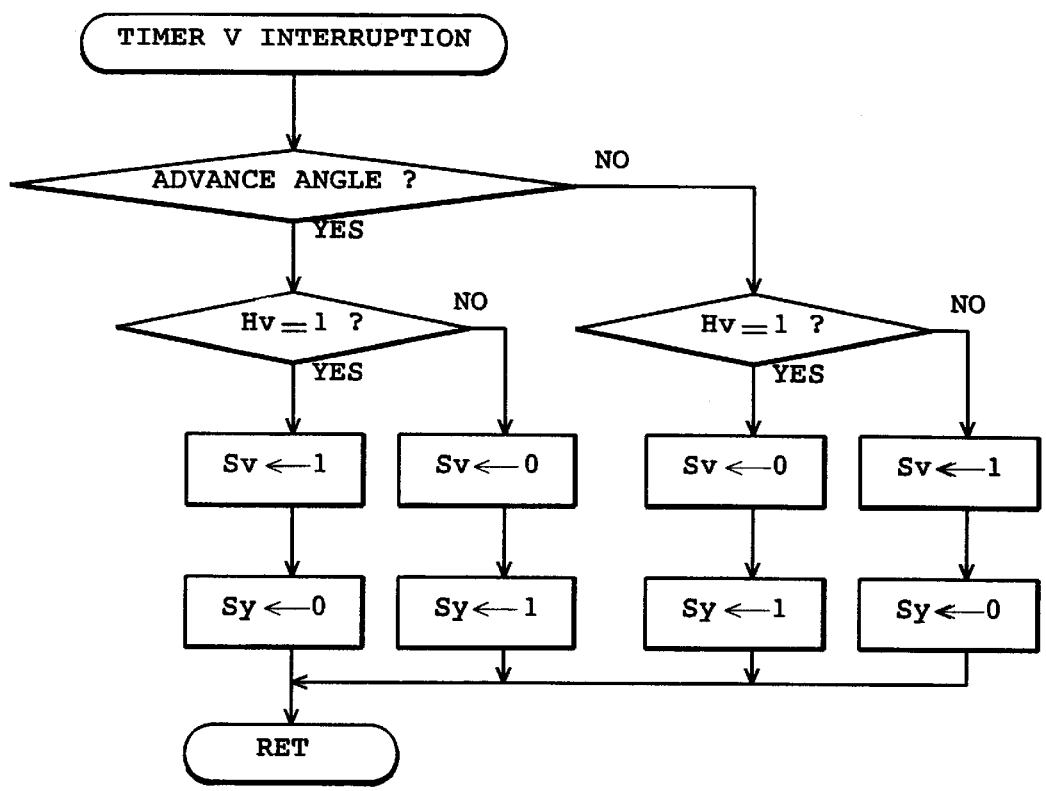
FIG. 15 is a flow chart showing an algorithm of another interruption routine of the program of FIG. 11 by way of example.
Figure 16:
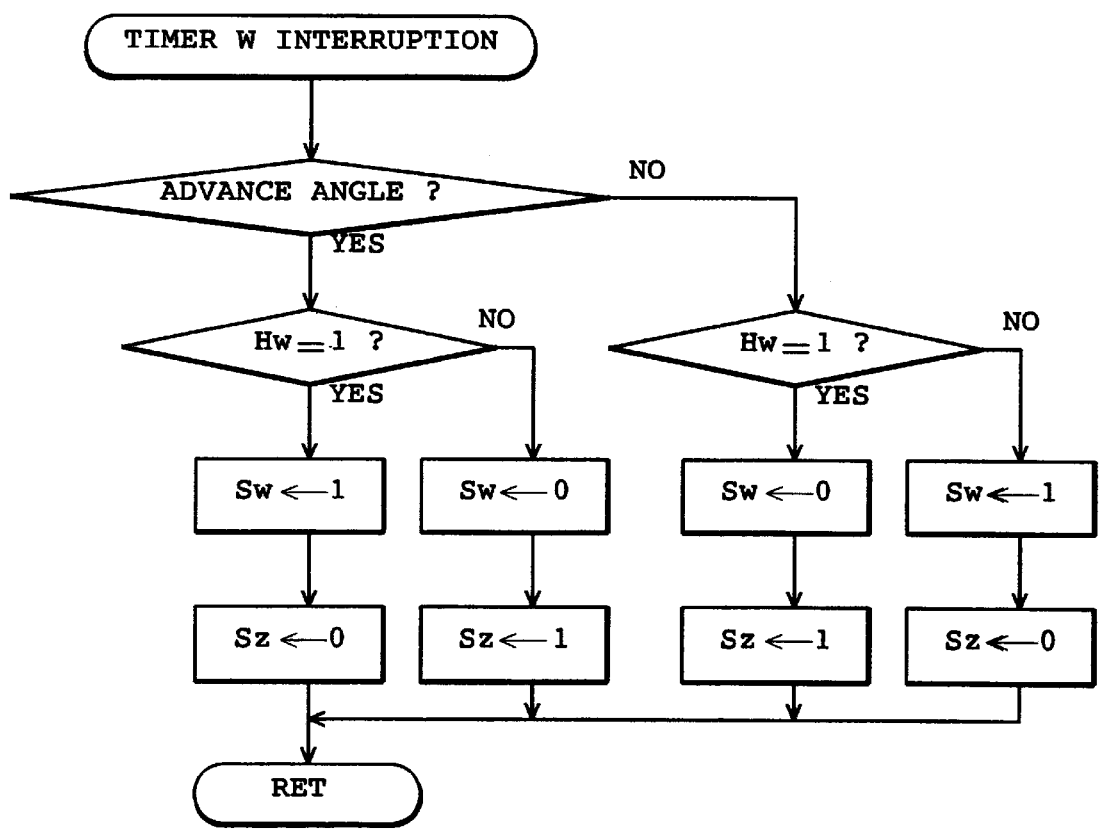
FIG. 16 is a flow chart showing an algorithm of a still further interruption routine of the program of FIG. 11 by way of example.

Then, when the timers U to W each complete counting of the counted value set therein, interruption routines shown in FIGS. 14 to 16 are executed, resulting in the drive signals Su to Sw and Sx to Sz being generated.

Now, processing in the interruption routine for generating the drive signal will be described with reference to an interruption routine of FIG. 14 executed when the timer U completes counting operation.

In the interruption routine shown in FIG. 14, it is first judged whether the AC control voltage is to be advanced or delayed. When it should be delayed, it is judged whether or not the position detection is at a high level or at a state of "1". When the position detection signal Hu is judged to be at the high level, the drive signal Su is extinguished and the drive signal Sx is generated. Whereas, when the position detection signal Hu is judged to be at a low level, the drive signal Su is produced and the drive signal Sx is extinguished. Likewise, when the AC control voltage is advanced, a level of the position detection signal Hu is judged. When the position detection signal Hu is at a high level, the drive signal Su is generated and the drive signal Sx is extinguished. When the position detection signal Hu is judged to be at a low level, the drive signal Su is extinguished and the drive signal Sx is generated.

Likewise, the drive signal Sv and Sy are generated according to an interruption routine shown in FIG. 15 and the drive signals Sw and Sz are generated according to an interruption routine shown in FIG. 16.

In the illustrated embodiment, as described above, the 180-degree switching control wherein the drive period of the switch elements of the rectifying/switch circuit is set to be 180 degrees is carried out. However, the illustrated embodiment is not limited to such control. In order to attain the objects of the present invention, it is merely required to control a phase of the AC control voltage applied from the load through the switch circuit to the generating coils or carry out duty control of the switch elements of the switch circuit, resulting in increasing or decreasing magnetic flux interlinking the generating coil having a phase which permits it to feed an output current thereof to the load. Thus, it will be noted that a switching pattern of the switch circuit is not necessarily limited to that in the 180-degree switching control.

In FIG. 1, the battery is incorporated in the load 3. However, the present invention is not restricted to such a load. In the present invention, a capacitor increased in capacity to a level enough to function as a voltage accumulating means may be substituted for the battery in the load.

As can be seen form the foregoing, the present invention is constructed so as to apply an AC control voltage of a predetermined phase from the voltage accumulating means through the switch circuit to the generating coils of the magneto or subject the switch elements of the switch circuit to on-off operation at predetermined duty ratios, to thereby suitably vary a magnetic field acting on the generating coils, resulting in varying characteristics of the magneto. Such construction permits the magneto to be controlled in a diverse manner.

In particular, the present invention permits an output of the magneto to be controlled without using a regulator of the output short-circuit type, to thereby eliminate the disadvantages caused due to use of the regulator.

Also, the present invention permits controlling of input torque of the magneto, so that the input torque may be control led so as to reduce a burden on an internal combustion engine, to thereby enhance acceleration performance of the engine when the magneto is driven by the engine.

While an embodiment of the present invention has been particularly described with reference to the drawings, obvious modifications and variations are possible in light of the above teachings. It is therefore to be understood that, within the scope of the appended claims, the invention may be practiced otherwise than as specifically described.

What is claimed is:

1. A generating apparatus for feeding a DC current to a load including a voltage accumulating means, comprising:

a magneto which includes a rotor having a magnet field and a stator including generating coils;

a rectifying/switch circuit including a diode bridge full-wave rectifying circuit and a switch circuit;

said diode bridge full-wave rectifying circuit being constituted by diodes of 2n (n: an integer of 2 or more) in number bridge-connected to each other and operable to feed an output of said magneto to said load while rectifying the output;

said switch circuit being constituted by switch elements of 2n in number respectively connected to said diodes by reverse parallel connection, to thereby be bridge-connected to each other; and a switch control unit for setting both a drive period and a non-drive period of each of said switch elements of said switch circuit and feeding each of said switch elements with a drive signal for keeping each of said switch elements turned on during said set drive period, resulting in an AC control voltage having a predetermined phase angle with respect to a voltage induced across said generating coils during non-loading being applied from said voltage accumulating means through said switch circuit to said generating coils;

said switch control unit including a phase angle control means for varying a phase of said control voltage with respect to the voltage induced on said generating coils during no-load from a delay phase to an advance phase so that specific characteristics of said magneto may be controlled as desired.

2. A generating apparatus as defined in claim 1, wherein said specific characteristics include a relationship of output current to rotational speed of said magneto.

3. A generating apparatus as defined in claim 1, wherein said specific characteristics include a relationship of input torque to rotational speed of said magneto.

4. A generating apparatus for feeding a DC current to a load including a voltage accumulating means, comprising:

a magneto which includes a rotor having a magnet field and a stator including generating coils;

a rectifying/switch circuit including a diode bridge full-wave rectifying circuit and a switch circuit;

said diode bridge full-wave rectifying circuit being constituted by diodes of 2n (n: an integer of 2 or more) in number bridge-connected to each other and serving to feed an output of said magneto to said load while rectifying the output;

said switch circuit being constituted by switch elements of 2n in number respectively connected to said diodes by reverse parallel connection, to thereby be bridge-connected to each other; and a switch control unit for setting both a drive period and a non-drive period of each of said switch elements of said switch circuit and feeding each of said switch elements with a drive signal for keeping each of said switch elements turned on during said set drive period, resulting in an AC control voltage having a predetermined phase angle with respect to a voltage induced across said generating coils during no-load being applied from said voltage accumulating means through said switch circuit to said generating coils;

said switch control unit including a duty control means for subjecting the switch elements in the drive period of the upper-side or lower-side switch elements of the bridge of said switch circuit to on-off control at predetermined duty ratios to control an average value of said AC control voltage so that specific characteristics of said magneto may be controlled as desired.

5. A generating apparatus as defined in claim 4, wherein said specific characteristics include a relationship of output current to rotational speed of said magneto.

6. A generating apparatus as defined in claim 4, wherein said specific characteristics include a relationship of input torque to rotational speed of said magneto.

7. A generating apparatus for feeding a DC current to a load including a voltage accumulating means, comprising:

a magneto which includes a rotor having a magnet field and a stator including m-phase (m: an integer of 3 or more) generating coils;

a plurality of position detectors, each of said plurality of position detectors being arranged to detect a rotation angle position of said magnet field with respect to each of said generating coils;

a rectifying/switch circuit including a diode bridge full-wave rectifying circuit and a switch circuit;

said diode bridge full-wave rectifying circuit being constituted by diodes of 2n (n: an integer of 2 or more) in number bridge-connected to each other and serving to feed an output of said magneto to said load while rectifying the output;

said switch circuit being constituted of switch elements of 2n in number respectively connected to said diodes by reverse parallel connection, to thereby be bridge-connected to each other; and a switch control unit for subjecting each of said switch elements of said switch circuit to on-off control so as to apply an m-phase AC control voltage, which has a predetermined phase angle with respect to a voltage induced across said generating coils during no-load, from said voltage accumulating means through said switch circuit to said generating coils;

said switch control unit including a switch pattern determining means and a switch drive circuit, said switch pattern determining means being operable to determine both a drive period and a non-drive period of each of said switch elements of said switch circuit on the basis of the rotation angle position of said magnet field detected by said position detector so that specific characteristics of said magneto may be controlled as desired, said switch drive circuit being operable to feed each of said switch elements with a drive signal for keeping each of said switch elements turned on during the drive period determined by said switch pattern determining means;

said switch pattern determining means being operable to vary a phase of said control voltage from a delay phase to an advance phase depending on a state of said specific characteristics.

8. A generating apparatus as defined in claim 7, wherein said specific characteristics include a relationship of output current, to rotational speed of said magneto.

9. A generating apparatus as defined in claim 7, wherein said specific characteristics include a relationship of input torque to rotational speed of said magneto.

10. A generating apparatus for feeding a DC current to a load including a voltage accumulating means, comprising:

a magneto which includes a rotor having a magnet field and a stator including m-phase (m: an integer of 3 or more) generating coils;

a plurality of position detectors, each of said plurality of position detectors being arranged to detect a rotation angle position of said magnet field with respect to each of said generating coils;

a rectifying/switch circuit including a diode bridge full-wave rectifying circuit and a switch circuit;

said diode bridge full-wave rectifying circuit being constituted by diodes of 2n (n: an integer of 2 or more) in number bridge-connected to each other and serving to feed an output of said magneto to said load while rectifying the output;

said switch circuit being constituted by switch elements of 2n in number respectively connected to said diodes by reverse parallel connection, to thereby be bridge-connected to each other, said switch elements including upper-side and lower-side switch elements; and a switch control unit for subjecting each of said switch elements of said switch circuit to on-off control so as to apply an m-phase AC control voltage, which has a predetermined phase angle with respect to a voltage induced across said generating coils during no-load, from said voltage accumulating means through said switch circuit to said generating coils;

said switch control unit including a switch pattern determining means, a switch drive circuit, and a duty control means, said switch pattern determining means being operable to determine both a drive period and a non-drive period of each of said switch elements of said switch circuit on the basis of the rotation angle position of said magnet field detected by said position detector so as to generate said AC control voltage at a phase suitable to permit specific characteristics of said magneto to be controlled as desired, said switch drive circuit being operable to feed each of said switch elements with a drive signal for keeping each of said switch elements turned on during the drive period determined by said switch pattern determining means, said duty control means subjecting the switch elements in the drive period of the upper-side or lower-side switch elements of the bridge of said switch circuit to on-off control at predetermined duty ratios to control an average value of said AC control voltage and thereby control said specific characteristics.

11. A generating apparatus as defined in claim 10, wherein said specific characteristics include a relationship of output current to rotational speed of said magneto.

12. A generating apparatus as defined in claim 10, wherein said specific characteristics include a relationship of input torque to rotational speed of said magneto.

* * * * *

UNITED STATES PATENT AND TRADEMARK OFFICE
CERTIFICATE OF CORRECTION

PATENT NO. : 6,049,194
DATED : April 11, 2000
INVENTOR(S) : Nakagawa et al.

It is certified that error appears in the above-indentified patent and that said Letters Patent is hereby corrected as shown below:

Column 2, Lines 44-45, delete "to be flow the load" and insert --flow to the load--.

Column Line 52, delete "and".

Column 5, Line 58, delete "Ω" and insert --ω--.

Column 5, Table (1), delete "Ω" and insert --ω--.

Column 6, Line 3, delete "τT'" and insert --τE'--.

Column 12, Line 61, after "connection," insert --and--.

Column 17, Line 6, delete "thee" and insert --the--.

Column 20, Line 11, delete "man" and insert --map--.

Column 23, Line 20, (Claim 8, Line 3), delete "," (comma).

Signed and Sealed this

Sixth Day of March, 2001

Attest:

NICHOLAS P. GODICI

Attesting Officer   Acting Director of the United States Patent and Trademark Office